US012733015B2

(12) United States Patent
Guo et al.

(10) Patent No.: US 12,733,015 B2
(45) Date of Patent: Sep. 8, 2026

(54) TECHNIQUES FOR INTER-USER EQUIPMENT COORDINATION

(71) Applicant: QUALCOMM Incorporated, San Diego, CA (US)

(72) Inventors: Hui Guo, Beijing (CN); Tien Viet Nguyen, Bridgewater, NJ (US); Shuanshuan Wu, San Diego, CA (US); Sourjya Dutta, San Diego, CA (US); Kapil Gulati, Belle Mead, NJ (US); Gabi Sarkis, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 289 days.

(21) Appl. No.: 18/294,135

(22) PCT Filed: Sep. 30, 2021

(86) PCT No.: PCT/CN2021/122072

§ 371 (c)(1),
(2) Date: Jan. 31, 2024

(87) PCT Pub. No.: WO2023/050266

PCT Pub. Date: Apr. 6, 2023

(65) Prior Publication Data

US 2025/0097957 A1 Mar. 20, 2025

(51) Int. Cl.

*H04W 72/25* (2023.01)
*H04B 17/318* (2015.01)
*H04W 72/02* (2009.01)

(52) U.S. Cl.

CPC .......... *H04W 72/25* (2023.01); *H04B 17/328* (2023.05); *H04W 72/02* (2013.01)

(58) Field of Classification Search

CPC ..... H04W 72/02; H04W 72/25; H04B 17/328

(Continued)

(56) References Cited

U.S. PATENT DOCUMENTS 12,317,231 B2 * 5/2025 Li .................... H04W 72/0446
12,507,207 B2 * 12/2025 Kiilerich Pratas .... H04W 72/02

(Continued)

FOREIGN PATENT DOCUMENTS

CN 112291743 A 1/2021
CN 112423273 A 2/2021

(Continued)

OTHER PUBLICATIONS

Fujitsu: "Considerations on Inter-UE Coordination for Mode 2 Enhancements", 3GPP TSG RAN WG1 Meeting #106-e, R1-2107038, e-Meeting, Aug. 16-27, 2021, pp. 1-27, Section 2.1.

(Continued)

*Primary Examiner* — Peter G Solinsky
(74) *Attorney, Agent, or Firm* — Patterson + Sheridan, L.L.P.

(57) ABSTRACT

Certain aspects of the present disclosure provide techniques for inter-user equipment (UE) coordination. A method, performed by a second UE, includes transmitting, to a first UE, a request for inter-UE coordination information, receiving a first indication from the first UE indicating a first set of resources for one or more transmissions by the second UE based on the request for inter-UE coordination information, and transmitting, based on the received first indication of the first set of resources, the one or more transmissions using a second set of resources.

27 Claims, 15 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0095280 | A1* | 3/2022 | Farag | H04W 72/02 |
| 2022/0225375 | A1* | 7/2022 | Wang | H04L 1/1896 |
| 2022/0303956 | A1* | 9/2022 | Hong | H04W 4/40 |
| 2022/0322301 | A1* | 10/2022 | Kiilerich Pratas | H04W 72/20 |
| 2022/0361147 | A1* | 11/2022 | Sarkis | H04W 72/0446 |
| 2023/0032706 | A1* | 2/2023 | Wu | H04W 72/23 |
| 2023/0107863 | A1* | 4/2023 | Farag | H04L 5/0073 370/329 |
| 2023/0269705 | A1* | 8/2023 | Park | H04W 72/563 370/329 |
| 2023/0389002 | A1* | 11/2023 | Hui | H04L 5/0064 |
| 2024/0260064 | A1* | 8/2024 | Leon Calvo | H04W 76/14 |
| 2024/0381399 | A1* | 11/2024 | Hwang | H04W 4/40 |

FOREIGN PATENT DOCUMENTS

| | | | |
|---|---|---|---|
| WO | 2021109358 | A1 | 6/2021 |
| WO | 2021167427 | A1 | 8/2021 |
| WO | 2021184255 | A1 | 9/2021 |

OTHER PUBLICATIONS

International Search Report and Written Opinion—PCT/CN2021/122072—ISA/EPO—May 26, 2022.
Samsung: "On Inter-UE Coordination for Mode2 Enhancements", 3GPP TSG RAN WG1 #106-e, R1-2106910, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, 7 Pages, XP052033340, Section 2.
Supplementary European Search Report—EP21958844—Search Authority—The Hague—May 23, 2025.

* cited by examiner

100
HSS
174
EPC
160
Other MMEs
164
MME
162
MBMS GW
168
Serving Gateway
166
BM-SC
170
PDN Gateway
172
IP Services
176
132
UDM
196
5GC
190
Other AMFs
193
AMF
192
SMF
194
UPF
195
IP Services
197
184
Inter-UE Coordination Component
198
102/180
182'
182"
182
104
158
110
120
134
102
102 (102')
110 (110')
150
152
154

TECHNIQUES FOR INTER-USER EQUIPMENT COORDINATION

CROSS-REFERENCE TO RELATED APPLICATIONS

This application is a national stage application under 35 U.S.C. 371 of PCT/CN2021/122072, filed Sep. 30, 2021, which is hereby expressly incorporated by reference herein in its entirety as if fully set forth below and for all applicable purposes.

INTRODUCTION

Aspects of the present disclosure relate to wireless communications, and more particularly, to techniques for inter-user equipment (UE) coordination.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for inter-user equipment (UE) coordination performed by a first UE. The method includes receiving, from at least a second UE, a request for inter-UE coordination information and transmitting at least a first indication to the second UE indicating a first set of resources for one or more transmissions by the second UE based on the request for inter-UE coordination information.

One aspect provides a method for inter-UE coordination performed by a second UE. The method includes transmitting, to a first UE, a request for inter-UE coordination information, receiving a first indication from the first UE indicating a first set of resources for one or more transmissions by the second UE based on the request for inter-UE coordination information, and transmitting, based on the received first indication of the first set of resources, the one or more transmissions using a second set of resources.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for inter-user equipment (UE) coordination. For example, when communicating on a sidelink, a UE may select resources from a resource pool to use for transmitting one or more transmissions, which may be based on measurements performed in a sensing window. There may be certain limitations for some UEs with regard to sensing-based resource selection. Therefore, rather than having these UEs perform the sensing in order to select resources for transmission, in some cases, these UEs may instead request another UE to perform the sensing and to report back with an coordination information indicating available resources-a technique known as inter-UE coordination. In some cases, the coordination of resources among UEs can help improve communication reliability, for example, to solve potential resource collision due to half duplex constraints and hidden nodes.

Inter-UE coordination between UEs may involve a first UE receiving a request from a second UE for inter-UE coordination information. Thereafter, the first UE may determine a set of resources (e.g., preferred or not preferred) for one or more transmissions by the second UE. In some cases, the first UE may determine the set of resources based on channel measurements performed within a sensing window. The first UE may then transmit an indication of the set of resources to the second UE. The second UE may select one or more resources to perform the one or more transmission, in some cases, based on at least one of the set of resources received from the first UE or one or more channel measurements that the second UE, itself, has performed within the sensing window.

Aspects of the present disclosure provide techniques for assisting the first UE and the second UE in selecting resources for the one or more transmissions. Additionally, aspects of the present disclosure provide techniques for assisting the first UE in handling multiple requests for inter-UE coordination information received from multiple UEs, such as the manners of selecting sets of resources for each of the multiple UE and the manners in which these sets of resources are indicated to the multiple UEs.

Introduction to Wireless Communication Networks

Figure 1:
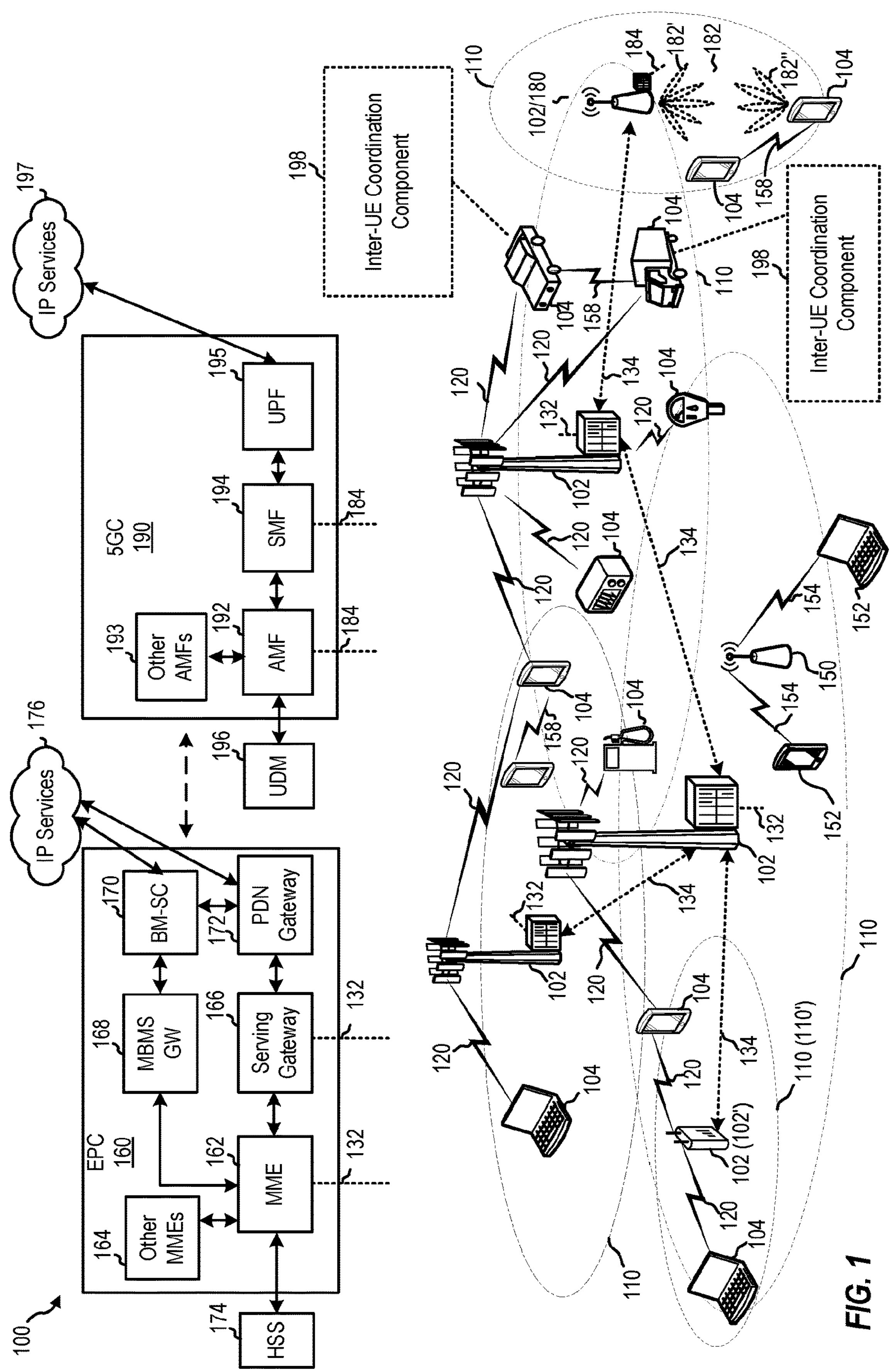
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of the BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 9:
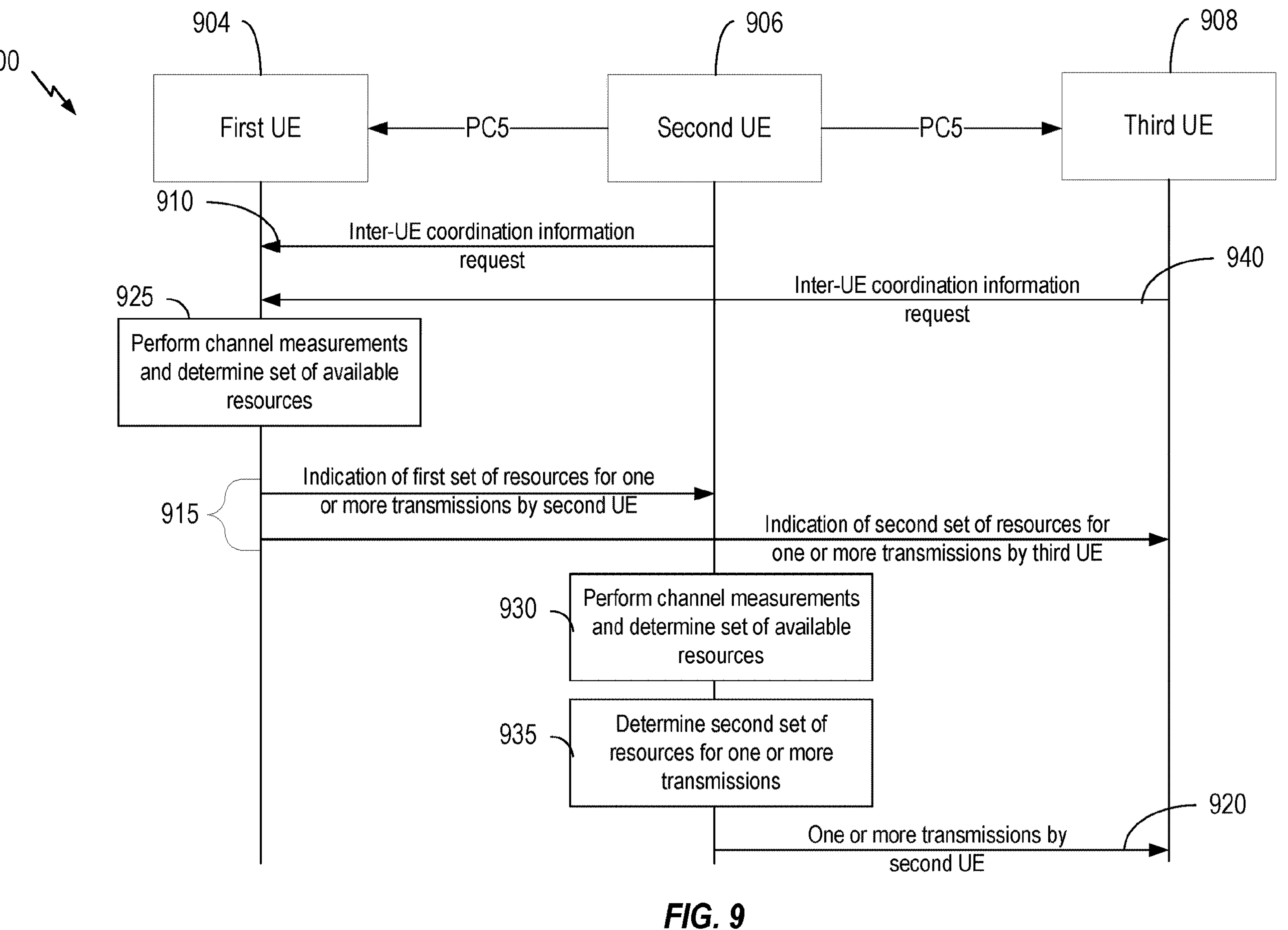
FIG. 9 is a call flow diagram illustrating example operations between a first UE, a second UE, and a third UE for inter-UE coordination.
Figure 14:
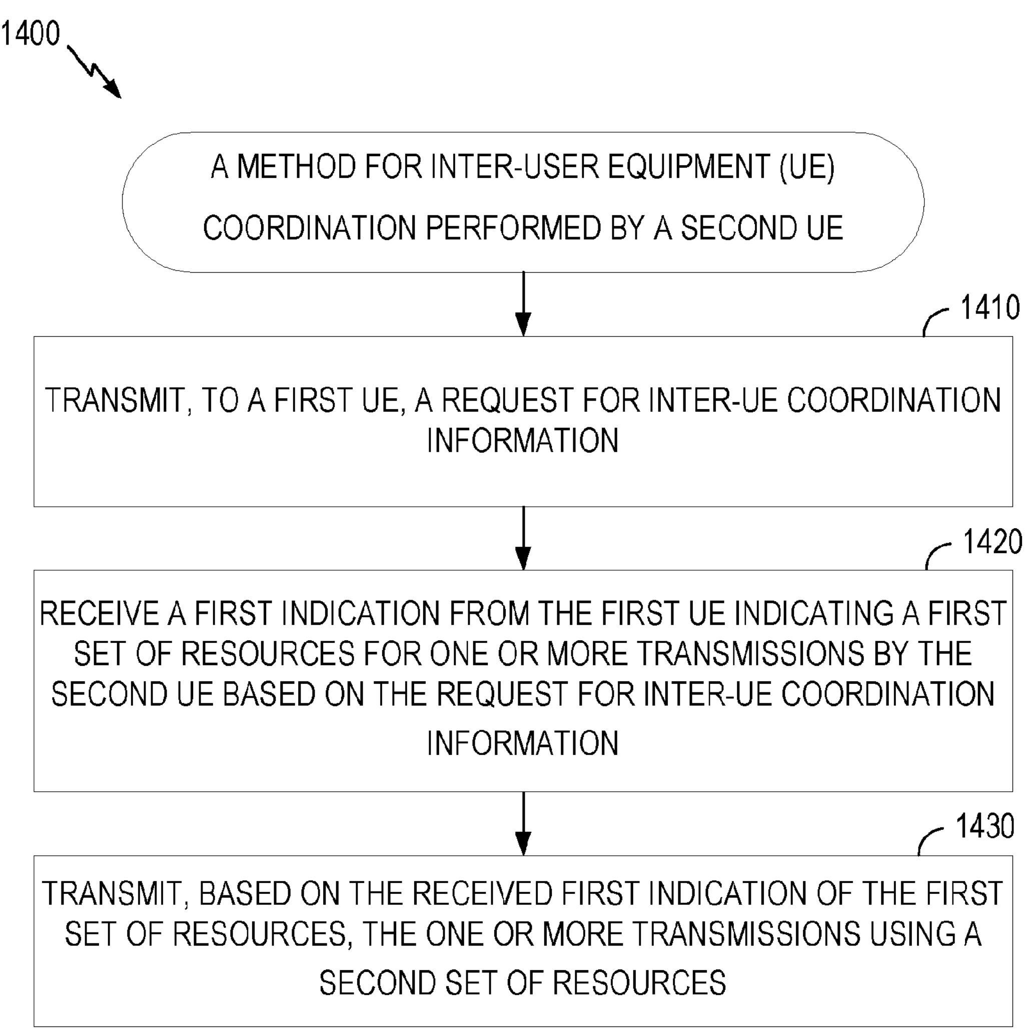
FIG. 14 is a flow diagram illustrating example operations for wireless communication.

Wireless communication network 100 further includes an inter-UE coordination component 198, which may be used configured to perform the operations in FIGS. 9, 14, and 14, as well as other operations described herein for inter-UE coordination.

Figure 2:
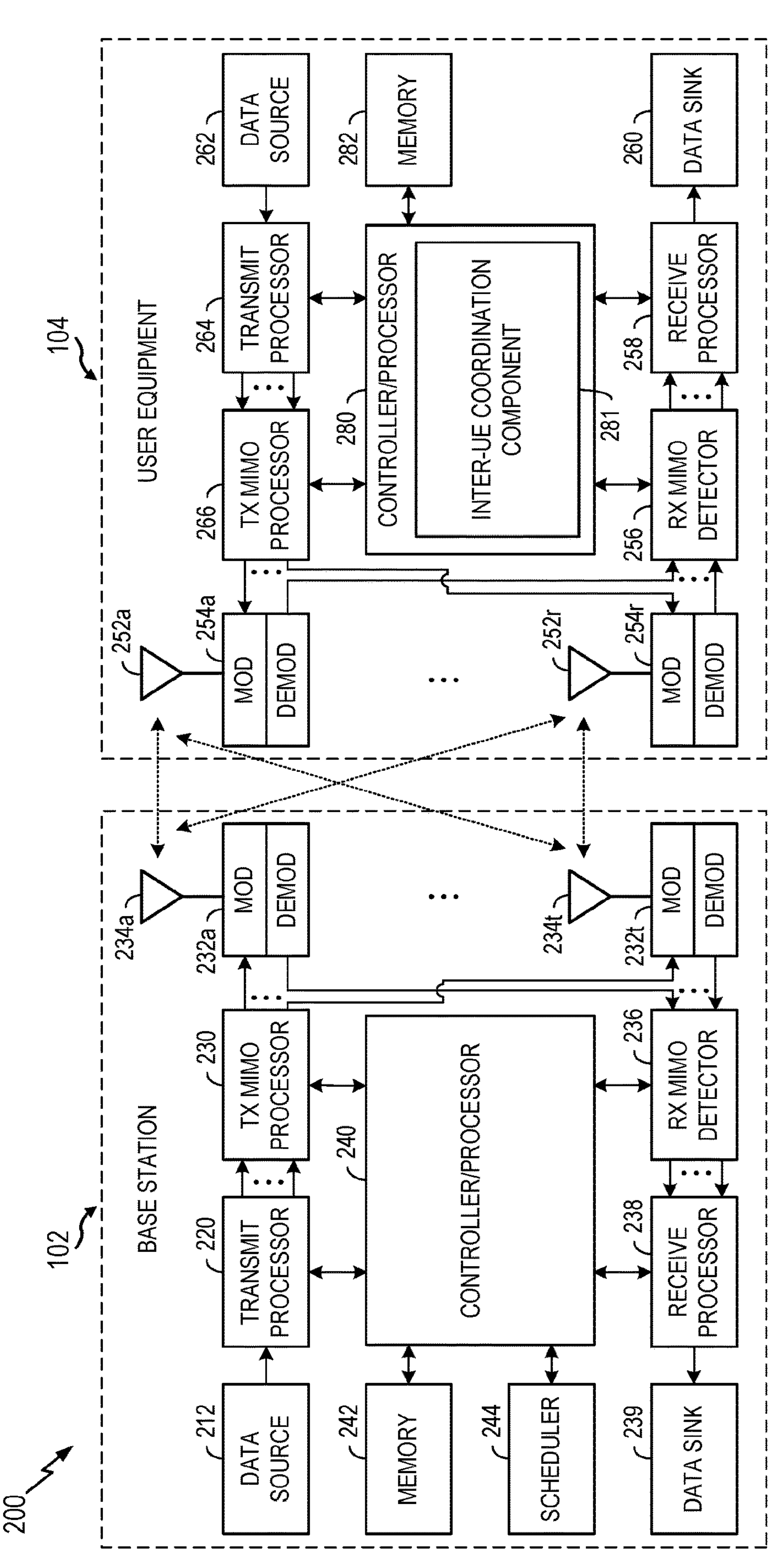
FIG. 2 is a block diagram conceptually illustrating aspects of an example of a base station and user equipment (UE).

FIG. 2 depicts aspects of an example a base station (BS) 102 and a user equipment (UE) 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes inter-UE coordination component 281, which may be representative of inter-UE coordination component 198 of FIG. 1. Notably, while depicted as an aspect of controller/processor 280, inter-UE coordination component 281 may be implemented additionally or alternatively in various other aspects of UE 104 in other implementations, including one or a combination of components illustrated in FIG. 2.

Figures 3A, 3B, 3C, 3D:
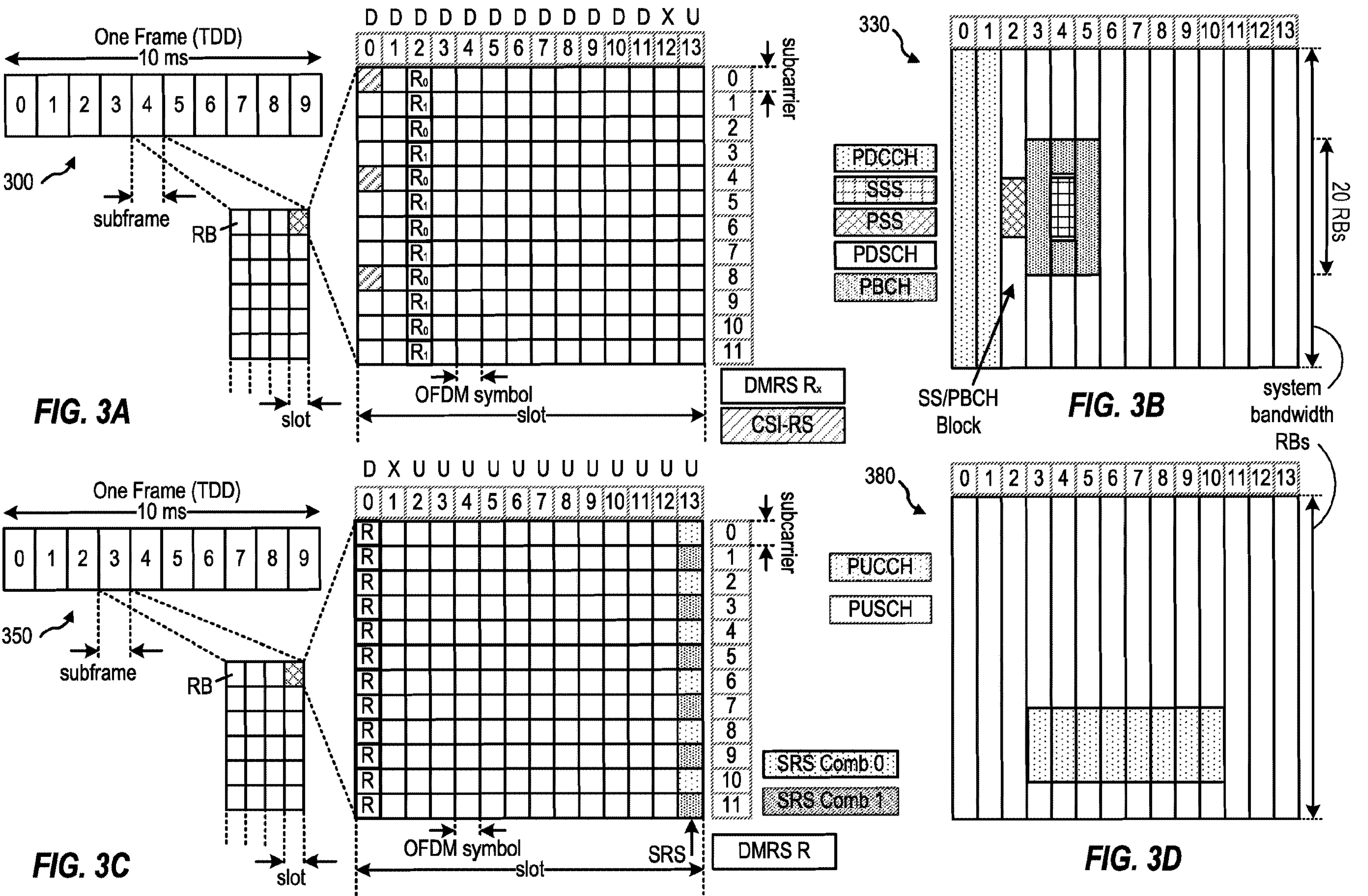
FIG. 3A depicts various example aspects of data structures for a wireless communication network
FIG. 3B depicts various example aspects of data structures for a wireless communication network
FIG. 3C depicts various example aspects of data structures for a wireless communication network
FIG. 3D depicts various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communication

In some examples, two or more subordinate entities (e.g., UEs 104) may communicate with each other using sidelink signals. Real-world applications of such sidelink communications may include public safety, proximity services, UE-to-network relaying, vehicle-to-vehicle (V2V) communications, vehicle-to-everything (V2X), Internet of Everything (IoE) communications, IoT communications, mission-critical mesh, and/or various other suitable applications. Generally, a sidelink signal may refer to a signal communicated from one subordinate entity (e.g., UE 104) to another subordinate entity (e.g., another UE 104) without relaying that communication through the scheduling entity (e.g., UE 104 or BS 102), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as acknowledgement (ACK) and or negative ACK (NACK) information corresponding to transmissions on the PSSCH. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figures 4A, 4B:
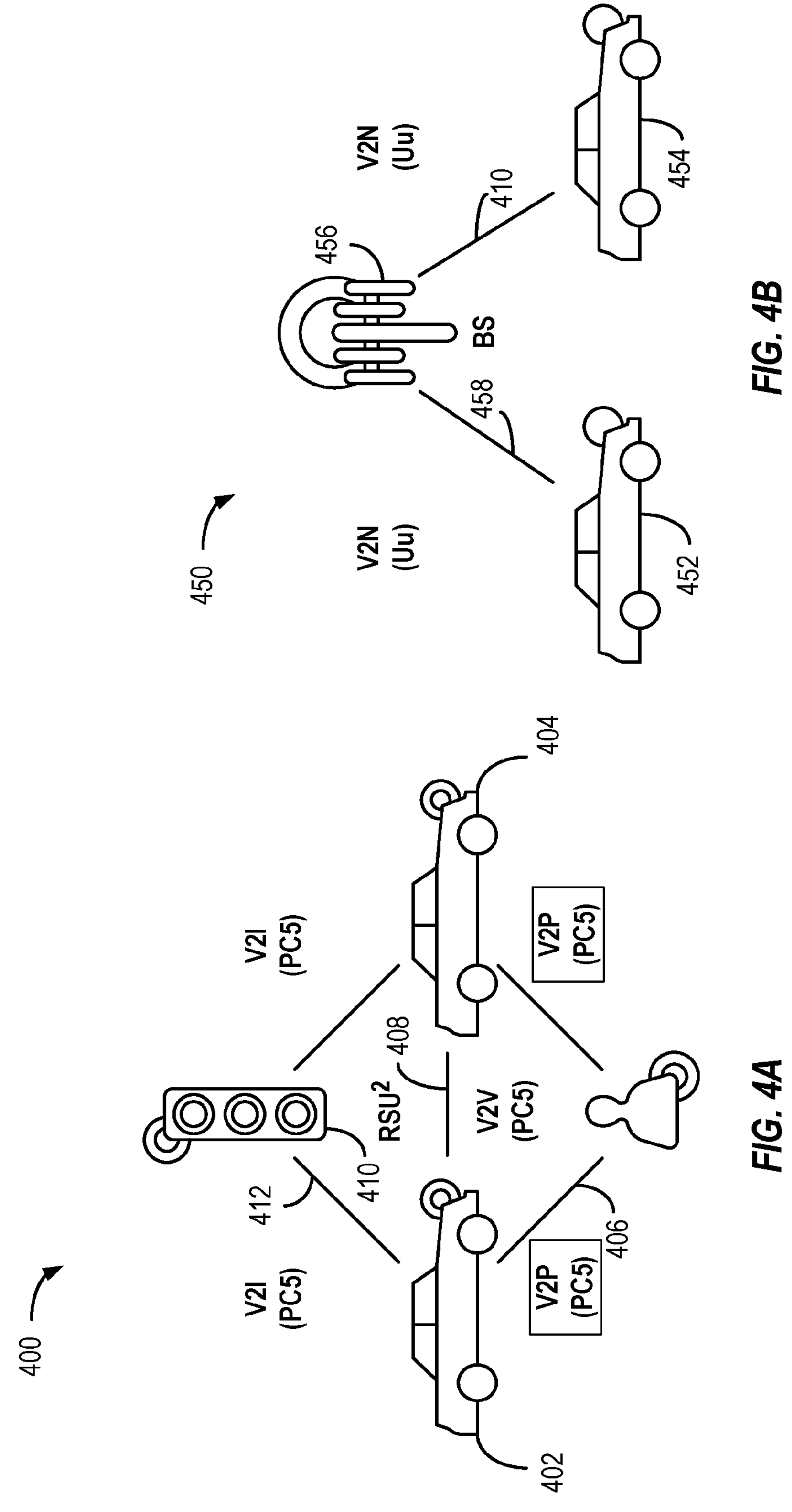
FIG. 4A shows diagrammatic representations of example vehicle to everything (V2X) systems.
FIG. 4B shows diagrammatic representations of example vehicle to everything (V2X) systems.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein. V2X is a vehicular technology system that enables vehicles to communicate with the traffic and the environment around them using short-range wireless signals, known as sidelink signals.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, roadside unit (RSU) 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 102), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

RSUs, such as RSU 410, may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Introduction to Sidelink Resource Mapping

When communicating on a sidelink a UE may use resources selected from a resource pool. The resource pool may be defined as a consecutive number of resource blocks (RBs) in the frequency domain in units of sub-channels. In other words, a resource pool may be composed of a plurality of consecutive RBs in frequency. In particular, a sub-channel may be defined as one or more of the RBs (e.g., that are consecutive), and a resource pool may be defined as one or more sub-channels.

Figure 5:
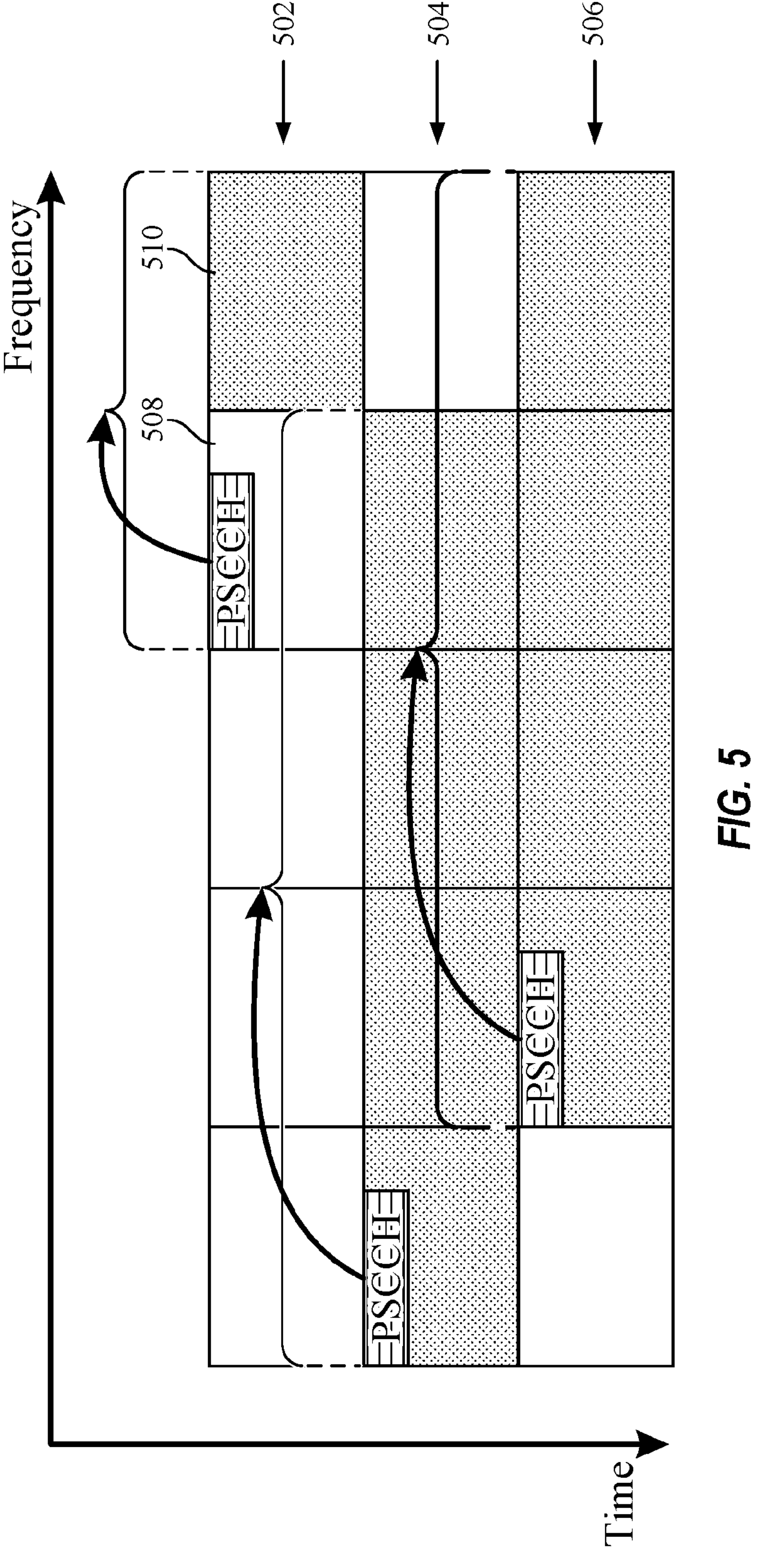
FIG. 5 shows a time-frequency grid illustrating example resource pools for sidelink communication, in accordance with certain aspects of the present disclosure.

FIG. 5 shows a time-frequency grid illustrating example resource pools for sidelink communication, according to certain aspects presented here. As can be seen, three different resource pools (e.g., 502, 504, and 506) are shown. The resource pool 502 may be composed of two sub-channels 508 (e.g., assigned a physical sidelink control channel (PSCCH) and a physical sidelink shared channel (PSSCH)) and 510 (e.g., assigned to the PSSCH), each of the two sub-channels 508 and 510 including a consecutive set of RBs spanning different frequencies. As shown, resources pool 504 and 506 may each include four sub-channels spanning different frequency bands.

In some cases, a sidelink resource pool may be defined by a number of parameters, such as the parameters sl-StartRB-Sub-channel, sl-Sub-channelSize, and sl-NumSub-channel, though it should be noted that they can be referred to in any suitable way. The parameter sl-StartRB-Sub-channel may define the first RB of the lowest index sub-channel of the resource pool. For example, with reference to resource pool 502, the parameter sl-StartRB-Sub-channel may specify the first RB of the sub-channel 508. Additionally, the parameter sl-Sub-channelSize may define the number of RBs of each sub-channel in the resource pool and the parameter sl-NumSub-channel may define the number of sub-channels in the resource pool. Accordingly, for example, with reference to resource pool 502, the parameter sl-NumSub-channel may define resource pool 502 to include two sub-channels (e.g., 508 and 510) and the parameter sl-Sub-channelSize may define that each of sub-channels 508 and 510 include 10 RBs to 100 RBs.

In some cases, within each sub-channel, a sidelink control channel, such as a physical sidelink control channel (PSCCH), may occupy a first number of RBs (e.g., where the number is the value of the parameter sl-FreqResourcePSCCH) and a first number of symbols (e.g., where the number is the value of a parameter sl-TimeResourcePSCCH) of the first sub-channel assigned to a sidelink shared data channel, such as a physical sidelink shared channel (PSSCH). In some cases, control information included in the PSCCH may allocate, starting from a current sub-channel in which the PSCCH is transmitted, how many sub-channels may be included within the PSSCH.

In some cases, a UE may need to transmit feedback information to indicate whether certain transmissions on a PSSCH have been successfully received or not. This feedback information may include acknowledgement (ACK) that a transmission was successfully received and decoded and/or negative ACK (NACK) that a transmission was not successfully decoded corresponding to the transmissions on the PSSCH/PSCCH. In some cases, this feedback information may be transmitted on a feedback channel, known as a physical sidelink feedback channel (PSFCH). In order to transmit feedback information on the PSFCH, a set of PSFCH resources can be directly decided or mapped according to a time/frequency location of the PSSCH, ACK/NACK bit cyclic shift, and/or Tx UE ID.

Figure 6:
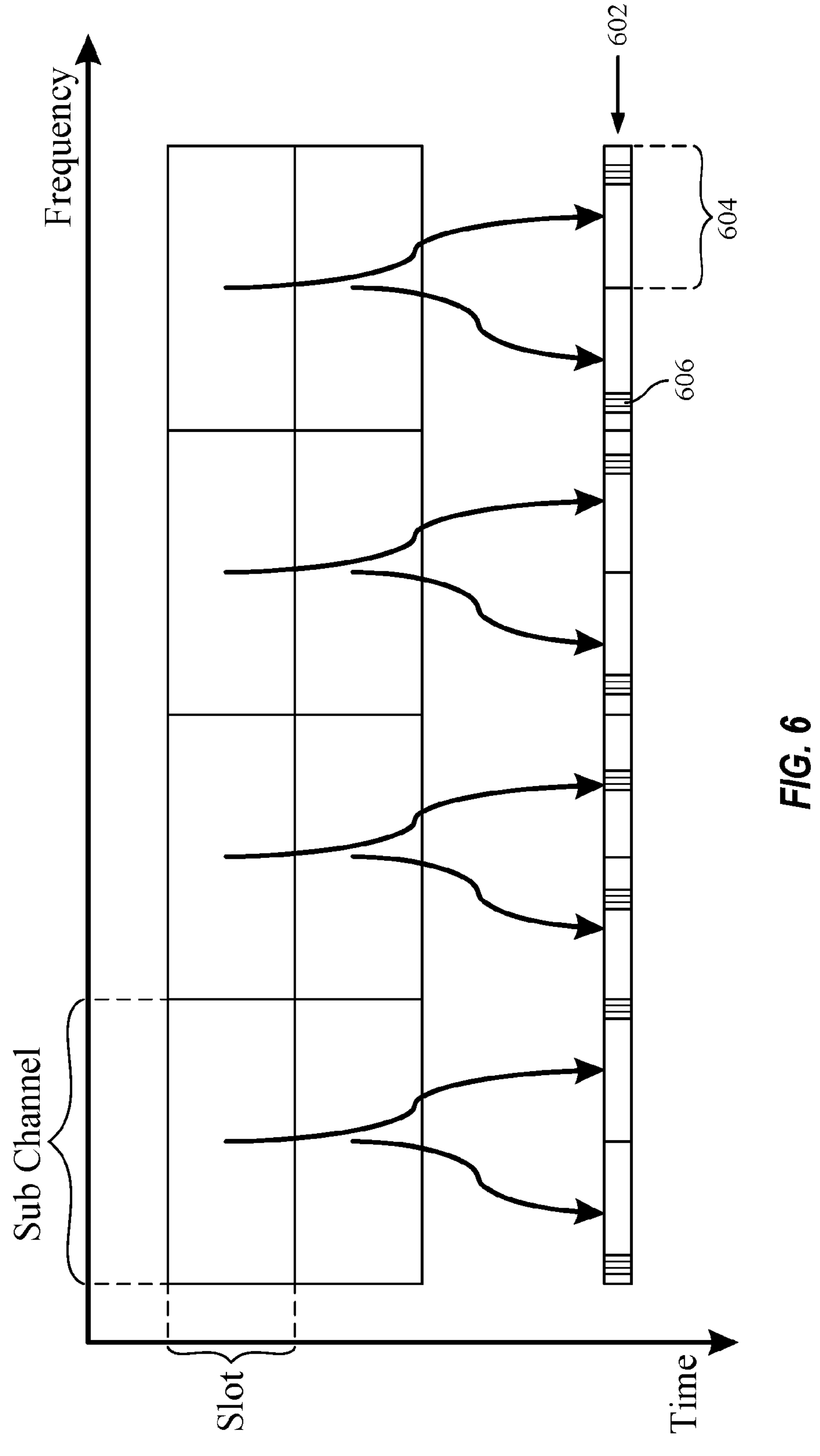
FIG. 6 illustrates an example sidelink feedback channel resource pool mapping, in accordance with certain aspects of the present disclosure.

An example PSFCH resource pool 602 is illustrated in FIG. 6. As shown, the PSFCH resource pool 602 may be separated into a set of separate sub-resource pools 604 each corresponding to a different sidelink sub-channels across different time slots. Though certain aspects are described in terms of slots, other appropriate time durations may similarly be used. For example, as shown in FIG. 6, a total of eight sub-channels across two time slots may be used to carry PSSCH/PSCCH information. Accordingly, the PSFCH resource pool 602 may be separated into eight different sub-resource pools 604 for carrying feedback information corresponding to the eight different sub-channels across the two time slots. Each sub-resource pool 604 may include a plurality of resources (e.g., RBs) and the UE may select one resource 606 of the plurality of resources within the sub-resource pool 604 to transmit the feedback information for each sub-channel.

Introduction to Resource Selection for Sidelink

In certain wireless communication systems (e.g., 5G NR systems), resource allocations for sidelink communications may be reservation based in a network scheduled mode or an autonomous mode. Under an autonomous mode, a UE may select resources from a common pool and reserve the selected resources by transmitting a reservation to other UEs. In certain cases, the transmission with reservation information may reserve resources in the current slot (or other suitable time period), in which the transmission is received, and up to a certain number of slots (or other suitable time periods) in the future (e.g., two slots in the future). Reservation information may be carried in sidelink control information (SCI), for example. The resource reservations may be periodic or aperiodic. In certain cases, the period can be signaled in SCI with configurable values between 0 milliseconds (ms) and 1000 ms. Periodic resource reservation and signaling may be disabled by a configuration or preconfigured as disabled.

Under the autonomous mode for sidelink communications, a UE may perform resource selection by identifying candidate resources in a pool of resources and selecting one or more of the candidate resources for sidelink communications with one or more other UEs. The UE may identify candidate resources by monitoring resources in the pool of resources and excluding certain resources based on various properties associated with the resources, such as reference signal received power (RSRP) measurements. In certain cases, a reserved resource may be pre-empted by a higher priority reservation made by another UE. A selected, but not yet reserved, resource may be reserved by another UE, and in such a case, the resource selection procedure may be triggered again.

Figure 7:
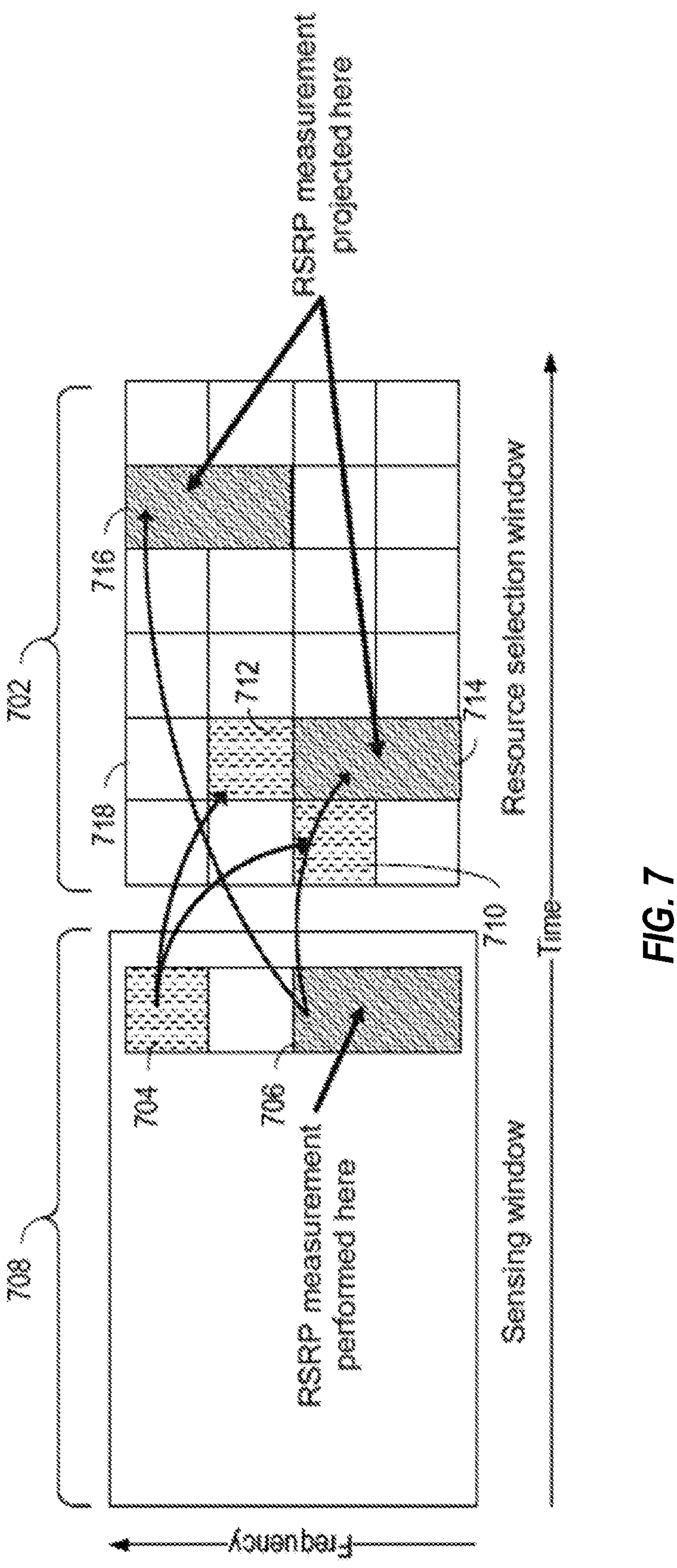
FIG. 7 illustrates a diagram of an example resource sensing window and an example resource selection window.

FIG. 7 illustrates a diagram of an example resource sensing window and an example resource selection window, in accordance with certain aspects of the present disclosure. A UE may determine whether candidate resources within the resource selection window 702 are available by decoding sidelink transmissions (e.g., the first and second transmissions 704, 706) and measuring various properties associated with the transmissions within the sensing window 708. The candidate resources may include the frequency-time resources in the resource selection window 702. In aspects, the transmissions 704, 706 may carry SCI with one or more reservations within the resource selection window 702. For example, the first transmission 704 may have SCI that reserves resources 710, 712 in the resource selection window 702, and the second transmission 706 may have SCI that reserves resources 714, 716 in the resource selection window 702. In certain aspects, the resource reservations in the transmission 704, 706 may have a priority indicated in that SCI that is also tracked as part of sensing and/or resource selection.

After the sensing window 708, the resource selection procedure may be triggered at the UE, for example, due to sidelink traffic being generated at the UE. The UE may select resources from the resource selection window 702 based at least in part on the measurements taken of the transmissions 704, 706 in the sensing window 708. For example, the RSRPs of the transmissions 704, 706 may be projected onto the reserved resources 710, 712, 714, 716 in the resource selection window 702. That is, the RSRP measurement for the first transmission 704 may be projected onto the reserved resources 710, 712, and the RSRP measurements for the second transmission may be projected on the reserved resources 714, 716. The resources in the resource selection window 702 with an RSRP less than or equal to a certain threshold may be considered available for sidelink communications. Other resources, such as the candidate resource 718, without any projected RSRP measurements may also be considered available for sidelink communications. In other words, the resources in the resource selection window 702 with a relatively low level of interference or no interference from other UEs may be considered available for sidelink communications. In aspects, the RSRPs may be for various sidelink reference signals, such as reference signals (e.g., demodulation reference signals) associated with the control and/or data portions of sidelink transmissions.

Techniques for Inter-User-Equipment Coordination

As noted above, when communicating on a sidelink, a UE may select resources from a resource pool to use for transmitting one or more transmissions, which may be based on measurements performed in a sensing window. There may be certain limitations for some UEs with regard to sensing-based resource selection. For example, some UEs are power-sensitive and may not be able to afford (from a power budget perspective) sensing (e.g., decoding transmissions and monitoring RSRP) continuously on all resources. Therefore, rather than having such UEs perform the sensing in order to select resources for transmission, in some cases, these UEs may instead request another UE (e.g., more capable in terms of power) to perform the sensing and to report back with an coordination information indicating available resources—a technique known as inter-UE coordination. In such a case, the coordination information based resource selection may enable the UE to eliminate the power consumption due to monitoring resources in the sensing window. Further, in some cases, the coordination of resources among UEs can also help improve communication reliability, for example, to solve potential resource collision due to half duplex constraints and hidden nodes.

Figure 8:
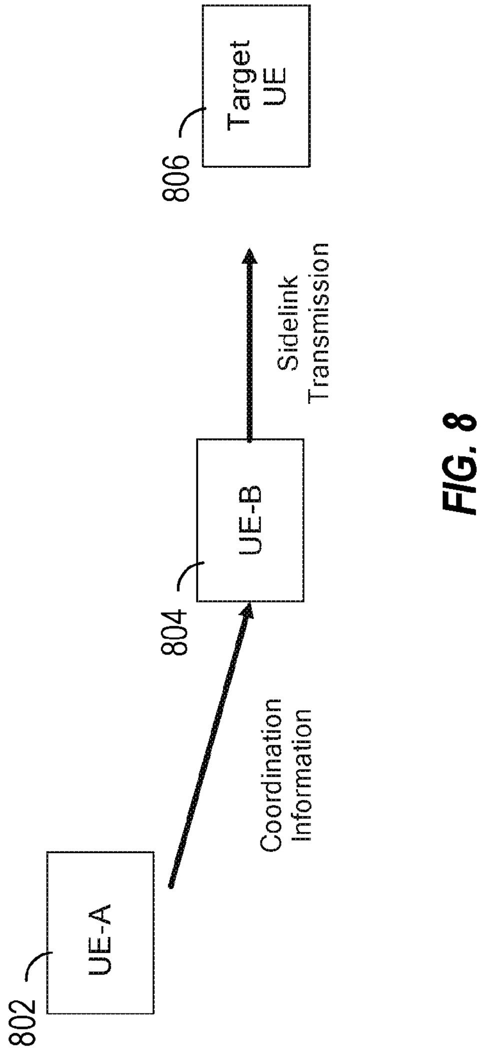
FIG. 8 illustrates an example of various sidelink transmissions where a UE receives coordination information from one or more other UEs.

FIG. 8 illustrates an example of various sidelink transmissions where a UE receives coordination information from one or more other UEs, in accordance with certain aspects of the present disclosure. The first UE 802 may generate coordination information reports (e.g., RSRP measurements, transmission priorities, slot, and/or location information corresponding to detected reservations) from monitoring resources in a sensing window (e.g., the sensing window 708). In some cases, the first UE 802 may be an example of the UE 104 illustrated in FIGS. 1-2. The first UE 802 may share the coordination information reports with one or more other UEs (e.g., the second UE 804). As used herein, a coordination information report may be a report that includes or indicates information associated with candidate resources and/or information associated with the UE generating the report. The second UE 804 may determine one or more available resources from a resource selection window for communicating with the target UE 806 based on the coordination information reports received from the first UE 802. The second UE 804 may communicate with the target UE 806 via the determined resources. For example, the second UE 804 may transmit various signals to the target UE 806 via the determined resources.

In aspects, the coordination information may include various information associated with candidate resources and/or various information associated with the UE that generated the coordination information. The coordination information may include an indication of which resources are preferred, an indication of which resources are not preferred, a set of resources to use for communications, a set of resources to avoid using for communications, an indication of colliding reservations, or a combination thereof. Additionally, or alternatively, the coordination information may include RSRP measurements, transmission priorities, slot, and/or location information corresponding to detected reservations. In certain aspects, the coordination information may further include location of the UE that generated the coordination information, a priority associated with the coordination information (e.g., the priority signaled in the SCI for reservations), a time indication of when the coordination information was generated, or a combination thereof.

Inter-UE coordination between UEs may involve a first UE (e.g., UE-A) receiving a request from a second UE (e.g., UE-B) for inter-UE coordination information. Thereafter, the first UE may determine a first set of resources for one or more transmissions by the second UE. The first set of resources may include preferred or non-preferred resources within a resource selection window for the one or more transmissions by the second UE. The first UE may then transmit an indication of the first set of resources to the second UE. In some cases, the second UE may select one or more resources from the first set of resources for the one or more transmissions. In some cases, the second UE may select the one or more resources from the first set of resources based on one or more channel measurements that the second UE, itself, has performed within a sensing window.

In some cases, the manner in which the second UE selects the one or more resources for the one or more transmissions has not been specified. Additionally, in some cases, the first UE may receive multiple requests for inter-UE coordination information from multiple second UEs, each of which require the first UE to transmit an indication of a set of resources to a corresponding second UE of the multiple second UEs. However, the manner in which the first UE transmits the (multiple) indications of the (multiple) sets of resources has not been specified. Accordingly, aspects of the present disclosure provide techniques to assist the first UE (e.g., UE-A) in transmitting these indication to multiple second UEs. Additionally, aspects of the present disclosure provide techniques to assist the first UE (e.g., UE-A) and the second UE (e.g., UE-B) in selecting resources for the one or more transmissions.

Example Call Flow Illustrating Operations for Inter-UE Coordination

FIG. 9 is a call flow diagram illustrating example operations 900 between a first UE 904, a second UE 906, and a third UE 908 for inter-UE coordination. In some cases, the first UE 904, the second UE 906, and the third UE 908 may each be an example of the UE 104 illustrated in FIG. 1 and may be capable of sidelink communication with each other. Further, as shown, a PC5 interface may be established to facilitate communication between the first UE 904, the second UE 906, and the third UE 908, however, in other aspects, a different type of interface may be used.

As shown, the operations 900 illustrated in FIG. 9 begin at 910 with the second UE 906 transmitting a request for inter-UE coordination information, which may be received by the first UE 904.

Thereafter, as shown at 915, the first UE 904 transmits at least a first indication to the second UE 906 indicating a first set of resources for one or more transmissions by the second UE 906 based on the request for inter-UE coordination information received at 910. In some cases, the first set of resources may include preferred or non-preferred resources within a resource selection window for the one or more transmissions by the second UE.

Thereafter, as shown at 920, the second UE 906 transmits, based on the indication of the first set of resources, the one or more transmissions using a second set of resources.

Additional details regarding the manner in which the first UE 904 transmits at least the first indication (e.g., when multiple inter-UE coordination information requests are received) and the manner in which the second UE 906 determines resources for transmitting the one or more transmission is described in further detail below.

Additional Details Regarding Resource Selection for the One or More Transmissions As noted above, aspects of the present disclosure provide techniques for assisting the first UE 904 and the second UE 906 in selecting resources for the one or more transmissions by the second UE 906.

For example, in response to receiving the request for the inter-UE coordination information from the second UE 906, the UE may determine the first set of resources for the one or more transmissions by the second UE 906. In some cases, the first UE 904 may determine the first set resources based on one or more channel measurements. For example, in some cases, in response to receiving the request for the inter-UE coordination information from the second UE 906, the first UE 904 may perform one or more channel measurements within a sensing window (e.g., such as the sensing window 708), as illustrated in block 925 in FIG. 9. In some cases, these one or more channel measurements may include reference signal received power (RSRP) measurements. Thereafter, the first UE 904 may determine the first set resources for the one or more transmissions by the second UE within a resource selection window based on the one or more channel measurements (e.g., also illustrated in block 925). The techniques for determining the first set of resources based on the channel measurements may be similar to those described above with respect to FIG. 7.

In some cases, when determining the first set of resources for the second UE 906, the first UE 904 excluding resources corresponding to time slots associated with an RSRP above a threshold RSRP. In some cases, these time slots may correspond to certain resource reservations with an RSRP above the threshold RSRP. By excluding slots associated with an RSRP above the threshold RSRP, the first UE 904 can avoid selecting resources suffering severe interference from inter-band emission (IBE) leakage.

In some cases, this threshold RSRP may be configured to the first UE 904 via higher layers or may be preconfigured in the first UE (e.g., via a manufacturer, network operator, retailer, etc.). As one example, the RSRP threshold may be −60 decibel milliwatts (dBm) for any time and frequency resource measured within the sensing window. In some cases, the RSRP threshold may be greater than a pre-configured RSRP exclusion threshold to provide added IBE protection. For example the pre-configured RSRP exclusion threshold may be defined according to Th($prio_{RX}$, $prio_{TX}$). In this case, the RSRP threshold may be an additional offset applied to the RSRP exclusion threshold and represented as ΔTh($prio_{RX}$, $prio_{TX}$). In such cases, ΔTh (e.g., the RSRP threshold) may be positive and may be configured by higher layer or pre-defined.

In some cases, the RSRP threshold may be defined based UE implementation. For example, in some cases, the RSRP threshold may be based on an in-channel selectivity (ICS) performance associated with the first UE 904. In some cases, the first UE 904 may also estimate IBE performance of the second UE 906 by measuring received signal strength indicator (RSSI) on other non-reserved sub-channel within a particular slot.

In some cases, the indication of the first set of resources may comprise different types of information. For example, in some case, the indication of the first set of resources may include a plurality of different starting slot (e.g., time) and sub-channel (e.g., frequency) positions. Each of different starting slot and sub-channel position may correspond to a different resource within the first set of resources.

Figure 10:
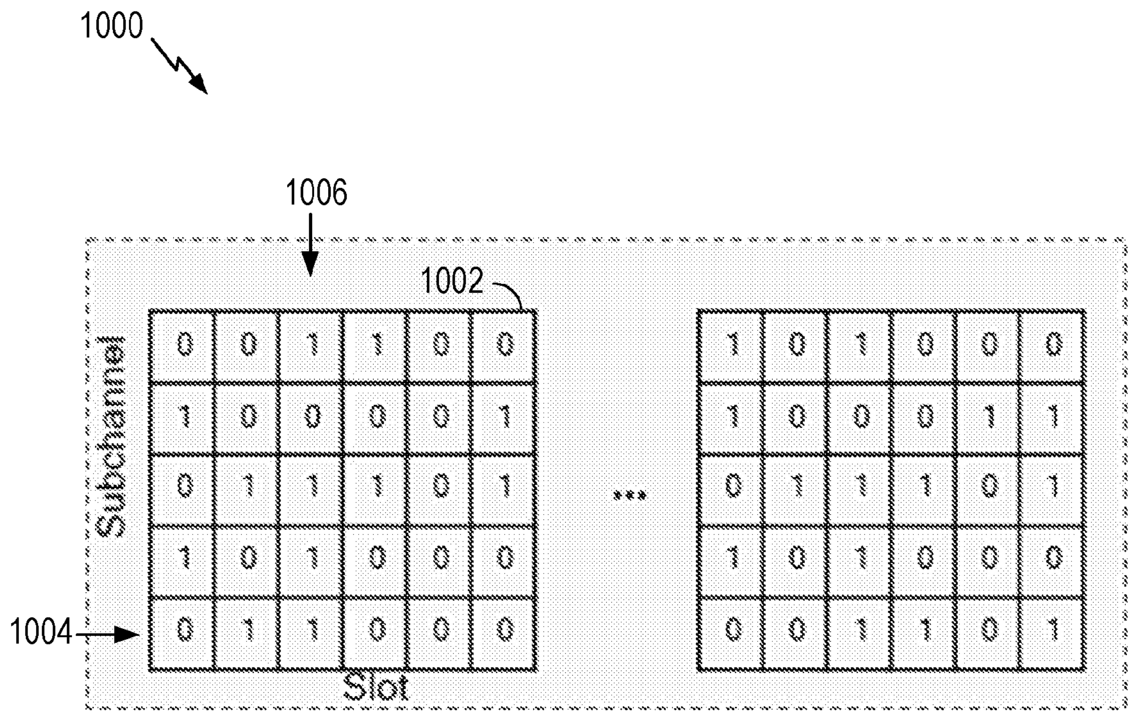
FIG. 10 illustrates and example bitmap for indicating a set of resources to a UE requesting inter-UE coordination information.

In some cases, the first indication of the first set of resources may comprise a bitmap, indicating which resources from a plurality of resources are included within the first set of resources. FIG. 10 illustrates and example bitmap 1000 for indicating a set of resources to a UE requesting inter-UE coordination information, such as the first set of resources for the second UE 906. As illustrated, the bitmap 1000 includes a plurality of cells 1002 arranged in rows 1004 and columns 1006. Each row 1004 may represent a different sub-channel and each column 1006 represents a different time slot. Accordingly, each cell 1002 represents a different time and frequency resource (e.g., time slot and sub-channel) within a resource selection window.

In some cases, when a cell 1002 includes a bit value of '1', this may indicate that the time and frequency corresponding to this cell 1002 is a preferred resource in the first set of resource and that this resource is available for the one or more transmissions by the second UE 906. In some cases, a bit value of '0' may indicate that a corresponding resource is unavailable and/or not preferred. In some cases, using a bitmap to indicate the first set of resources may save signaling overhead, especially when preferred resource number is large. For example, assume there are 100 slots within the resource selection window. In this case, ten sub-channels may only consume 1000 bits or 125 bytes.

In some cases, additional bits may be included within the bit map and may be used to indicate other information associated with each resource included within the first set of resources. For example, in some case, the additional bits may be used to indicate a level of preference associated with a particular resource or an RSRP or RSSI measured on the resource. In other words, the first indication indicating the first set of resources transmitted by the first UE 904 at 915 in FIG. 9 may include additional information indicating at least one of a preference associated with each resource included within the first set of resources or an RSRP associated with each resource included within the first set of resources.

In some cases, a bit value of '1' within a cell 1002 of the bitmap 1000 may indicate that a corresponding resource is "free" (e.g., available) to be used for the one or more transmissions by the second UE 906. In some cases, if the second UE 906 needs to select more than one sub-channels for the one or more transmissions, the second UE 906 may select consecutive "free" sub-channels.

In some cases, the second UE 906 may also transmit, to the first UE 904, a set of preferred resources for the one or more transmissions by the second UE 906. The set of preferred resources transmitted by the second UE 906 may be based on one or more channel measurements performed by the second UE 906, itself, as illustrated at 930 in FIG. 9. In some cases, the set of preferred resources may be indicated by the second UE 906 using a bitmap similar to the bitmap 1000 illustrated in FIG. 10. The first UE 904 may then use the set of preferred resources received from the second UE 906 to determine the first set of resources. For example, in some cases, the first UE 904 may select resources preferred by the first UE 904 from the set of preferred resources received from the second UE 906 to include within the first set of resources.

As noted above, the second UE 906 may transmit the one or more transmissions at 920 using a second set of resources. In some cases, the second set of resources used by the second UE 906 to transmit the one or more transmissions may be determined by the second UE 906 in block 935 in different manners.

For example, in some cases, the second set of resources may be determined based on one or more channel measurements performed by the second UE 906 in addition to the first set of resources received from the first UE 904. For example, as illustrated at 930, the second UE 906 may perform one or more channel measurements within a sensing window (e.g., sensing window 708 illustrated in FIG. 7) and may determine, based at least in part on the one or more channel measurements, a set of available resources for the one or more transmissions within a resource selection window. In some cases, the second UE 906 may determine the set of available resources using techniques similar to those described above with respect to FIG. 7.

In some cases, the second UE 906 may determine the second set of resources in block 935 based on an intersection between the first set of resources received from the first UE 904 and the set of available resources determined by the second UE 906. For example, in some cases, the second UE 906 may determine the intersecting set of resources from the set of available resources and the first set of resources received from the first UE 904. In some cases, whether the second UE 906 uses the intersecting set of resources or the set of available resources to determine the second set of resources for transmitting the one or more transmissions may be based on whether the intersecting set of resources is at least a first threshold percentage of the first set of resources.

Figure 11A:
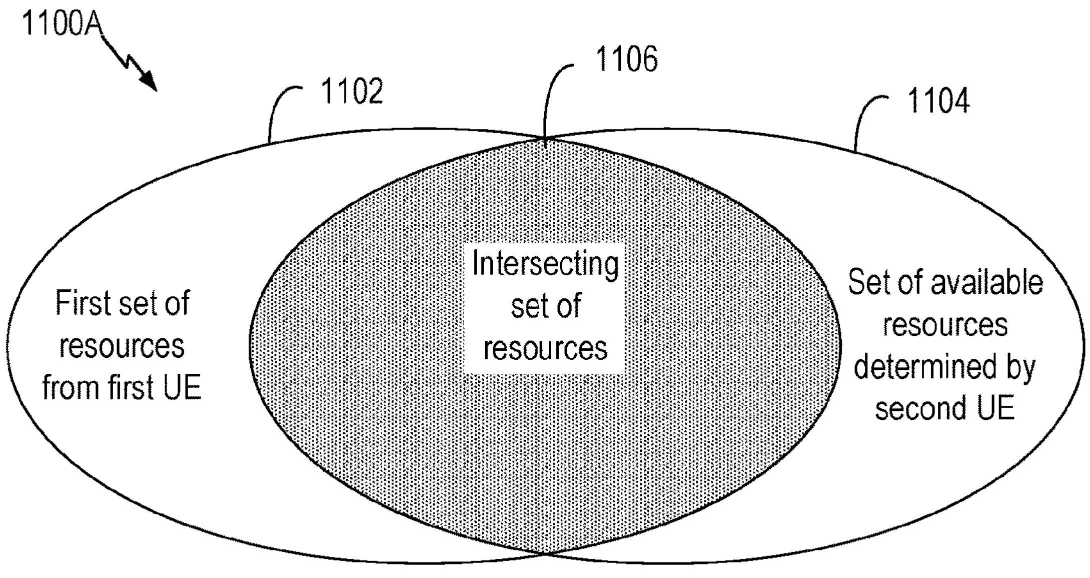
FIG. 11A illustrates a different Venn diagram showing a first set of resources, an available set of resources, and an intersecting set of resources.

For example, if the intersecting set of resources is greater than the first threshold percentage (e.g., Y) the set of preferred resources, as illustrated in FIG. 11A, then the second set of resources may be selected by the second UE 906 from the intersecting set of resources. In some cases, the first threshold percentage (Y) may be 50 percent and can be configured by higher layers or pre-configured in the second UE 906. FIG. 11A shows a Venn diagram 1100A, illustrating the first set of resources 1102 received from the first UE 904, the set of available resources 1104 determined by the second UE 906, and the intersecting set of resources 1106. As shown in FIG. 11A, the intersecting set of resources 1106 is at least 50 percent of the first set of resources 1102. Accordingly, when the intersecting set of resources 1106 is at least the first threshold percentage (e.g., 50%) of the first set of resources 1102, as shown in FIG. 11A, the second set of resources used to transmit the one or more transmissions by the second UE 906 may comprise one or more resources of the intersecting set of resources 1106.

Figure 11B:
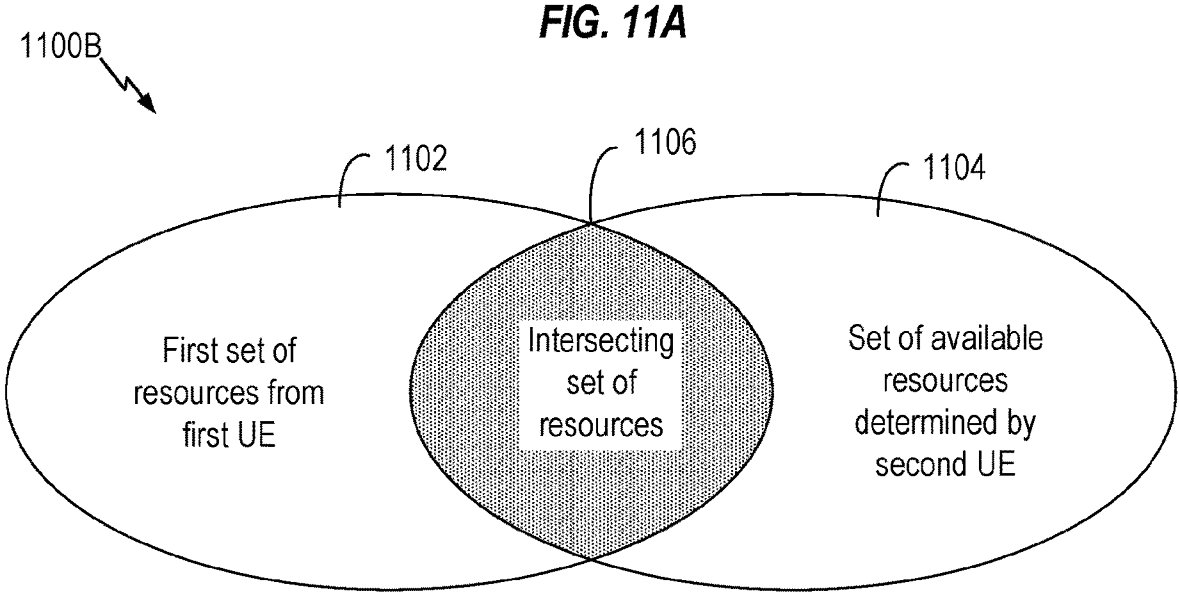
FIG. 11B illustrates a different Venn diagram showing a first set of resources, an available set of resources, and an intersecting set of resources.

In some cases, when the intersecting set of resources is less than the first threshold percentage of the first set of resources, as illustrated in FIG. 11B, the second set of resources may be selected by the second UE 906 from the set of available resources determined by the second UE 906. For example, as illustrated in the Venn diagram 1100B in FIG. 11, the intersecting set of resources 1106 is less than 50% of the first set of resources 1102. Accordingly, when the intersecting set of resources 1106 is less than the first threshold percentage (e.g., 50%) of the first set of resources 1102, as shown in FIG. 11B, the second set of resources used to transmit the one or more transmissions by the second UE 906 may comprise one or more resources of the set of available resources 1104. In other words, in this case, the second UE 906 may disregard the first set of resources 1102 received from the first UE 904 and may determine the second set of resources in block 935 for transmitting the one or more transmissions based on the set of available resources 1104 determined by the second UE 906.

In some cases, regardless of whether the intersecting set of resources is greater than or equal to the first threshold percentage, the second UE 906 may still determine the second set of resources for transmitting the one or more transmissions from the intersecting set of resources when the set of available resources determined by the second UE 906 is greater than a second threshold percentage (e.g., X) of a number of resources within the resource selection window (e.g., resource selection window 702). In other words, when the set of available resources is at least the second threshold percentage of a number of resources within the resource selection window, the second set of resources used to transmit the one or more transmissions comprises one or more resources of the intersecting set of resources. In some cases, when the set of available resources is less than the second threshold percentage of a number of resources within the resource selection window, the second set of resources used to transmit the one or more transmissions comprises one or more resources of the set of available resources. In other words, in this case, the second UE 906 may disregard the intersecting set of resources and may select the second set of resources for transmitting the one or more transmissions from the set of available resources determined by the second UE 906.

In some cases, to ensure that there are a sufficient number of resources within the intersecting set of resources to be selected from, the second UE 906 may be permitted to increase an RSRP threshold when performing the one or more measurements in block 930. By increasing the RSRP threshold, the number of resources within the set of available resources may be greater, leading to a greater number of resources within the intersecting set of resources. Accordingly, for example, in some cases, the second UE 906 may determine the intersecting set of resources is below a threshold amount of resources. In this case, the second UE 906 may increase the RSRP threshold until the intersecting set of resources is greater than or equal to the threshold amount of resources or a maximum RSRP threshold has been reached, whichever is first. In some cases, the RSRP threshold may be increased by 3 dB on each iteration. In some cases, the maximum RSRP threshold may defined according to a maximum number of times that the second UE 906 may increase the RSRP threshold, such as three times. For example, starting from an initial RSRP threshold, the second UE 906 may be permitted to increase the RSRP threshold by 3 dB three times until a maximum RSRP threshold is reached or until the intersecting set of resources is greater than or equal to the threshold amount of resources.

In some cases, when determining the second set of resources in block 935 for transmitting the one or more transmissions, the second UE 906 may first determine whether the first set of resources received from the first UE 904 are up to date. In some cases, the second UE 906 may determine whether the first set of resources are up to date based on a timer (e.g., $T_{delay}$) associated with the first set of resources. In some cases, the second UE 906 may be configured to disregard the first set of resources received from the first UE 904 after $T_{delay}$ of sending the request for inter-UE coordination information to the first UE 904 at 910 in FIG. 9. In this case, the second UE 906 may determine the second set of resources for the one or more transmissions from the set of available resources determined by the second UE 906. Otherwise, the second UE 906 may determine the second set of resources for the one or more transmissions from the intersecting set of resources determined from the set of available resources and the first set of resources Accordingly, for example, when the timer associated with the first set of resources has expired (e.g., after sending the request for inter-UE coordination information), the second set of resources comprises one or more resources from the set of available resources. Otherwise, when the timer associated with the first set of resources has not expired, the second set of resources comprises one or more resources from an intersecting set of resources determined from the set of available resources and the first set of resources.

In some cases, when determining the second set of resources in block 935 for transmitting the one or more transmissions, the second UE 906 may first determine an amount of usable resources from the first set of resources received from the first UE 904. In some cases, the second UE 906 may be configured to disregard the first set of resources if the amount of useable resource within the first set of resources is then than a threshold amount of usable resources (e.g., Z). In some cases, Z is a ratio of usable resources over all resources included within the first set of resources. In some cases, Z is pre-defined or configurable by a higher layer. For example, in some cases, when the amount of usable resources from the first set of resources is less than the threshold amount of usable resources (Z), the second UE 906 may determine the second set of resources for the one or more transmissions from the set of available resources determined by the second UE 906 (e.g., disregarding the first set of resources received from the first UE 904). In some cases, when the amount of usable resources from the first set of resources is greater than or equal to the threshold amount of usable resources, the second UE 906 may determine the second set of resources from one or more usable resources from the first set of resources.

In other words, when the amount of usable resources from the first set of resources is less than a threshold amount of usable resources, the second set of resources comprises one or more resources from the set of available resources. Additionally, when the amount of usable resources from the first set of resources is greater than or equal to the threshold amount of usable resources, the second set of resources comprises one or more usable resources from the first set of resources.

In some cases, determining the amount of usable resources from the first set of resources received from the first UE 904 may include determining a set of unusable resources from the first set of resources. In some cases, the set of unusable resources comprises resources from the first set of resources that are at least one of outside a resource selection window associated with the second UE or excluded by the second UE based on the one or more channel measurements. Accordingly, by determining the set of unusable resources from the first set of resources received from the first UE 904, the second UE 906 may be left over with a the amount of usable resources from the first set of resources.

In some cases, as noted above, the first set of resources received from the first UE 904 may include one or more non-preferred resources (e.g., resources which should be avoided when transmitting the one or more transmissions). In some cases, while in this case the first set of resources indicates one or more non-preferred resources, the second UE 906 may decide not to exclude these one or more non-preferred resources from the second set of resources determined by the second UE in block 935 when an RSRP measured by the second UE 906 on the one or more non-preferred resources is lower than a configured RSRP threshold. In some cases, this configured RSRP threshold may be based on one or more priorities.

For example, in some cases, if a priority of the one or more non-preferred resources is unknown by the second UE 906, the configured RSRP threshold may be based on a priority associated with the one or more transmissions by the second UE 906. In some cases, a lower configured RSRP threshold may be adopted if the priority associated with the one or more transmissions by the second UE 906 is high to avoid resource collision and guarantee second UE 906 communication performance.

In some cases, if the priority of the one or more non-preferred resources is known by the second UE 906, the configured RSRP threshold may be based on the priority associated with the one or more transmissions by the second UE 906 as well as the priority of the one or more non-preferred resources. For example, in some cases, the second UE 906 may be permitted to use the one or more non-preferred resources for the one or more transmissions (e.g., the one or more non-preferred resources may be included within the second set of resources) if the priority associated with the one or more transmissions is higher than the priority of the one or more non-preferred resources. Otherwise, the second UE 906 may exclude the one or more non-preferred resources from the second set of resources for transmitting the one or more transmissions when the priority of the one or more transmissions is lower than the priority of the one or more non-preferred resources.

Accordingly, for example, in some cases, the second UE 906 may always ignore the one or more non-preferred resources if the priority of the one or more transmissions by the second UE 906 is high enough. In other words, the one or more non-preferred resources may be pre-empted by a high priority reservation associated with the second UE 906. In other cases, the second UE 906 may ignore the one or more non-preferred resources if the priority of the one or more transmissions by the second UE 906 is high enough and the priority of the one or more non-preferred resources is low.

Additional Details Regarding Handling Multiple Inter-UE Coordination Information Requests As noted above, there may be cases in which the first UE 904 receives multiple requests for inter-UE coordination information from multiple other UEs, each of which require the first UE to transmit an indication of a set of resources to a corresponding other UE of the multiple other UEs. For example, as illustrated at 910 in FIG. 9, the first UE 904 receives a first request for inter-UE coordination information from the second UE 906. Further, as illustrated at 940, the first UE 904 may also receive a second request for inter-UE coordination information from the third UE 908. Accordingly, the first and second requests for the inter-UE coordination information may require the first UE 904 to determined sets of resources for each of the second UE 906 and the third UE 908. The manner in which the first UE 904 determines these sets of resources for the second UE 906 and the third UE 908 as well as how the first UE 904 transmits indications of these sets of resources to the second UE 906 and the third UE 908 is described below.

For example, as described above, at 915 in FIG. 9, the first UE 904 transmits the first indication to the second UE 906 indicating the first set of resources for the one or more by the second UE 906 based on the request for first request for inter-UE coordination information. Additionally, at 915, the first UE 904 transmits a second indication to the third UE 908 indicating a second set of resources for one or more transmissions by the third UE based on the second request for inter-UE coordination information.

In some cases, the first UE 904 may independently select different resources for transmitting the first indication indicating the first set of resources for the one or more transmissions by the second UE 906 and the second indication indicating the second set of resources for one or more transmissions by the third UE 908. The first UE 904 may then transmit the first indication and the second indication to the second UE 906 and third UE 908, respectively, in a unicast mode.

For example, in some cases, the first UE 904 may transmit the first indication indicating the first set of resources to the second UE 906 in a first message at 915 in FIG. 9. The first UE 904 may also transmit the second indication indicating the second set of resources to the third UE 908 in a second message at 915 in FIG. 9. In some cases, inter-UE coordination by default only reserves one sub-channel which may result in higher power spectral density (PSD) and interference to adjacent sub-channels. Accordingly, in some cases, to mitigate high IBE leakage when transmitting the first message and the second message, the first UE 904 may transmit the first message and the second message different time slots, as illustrated in FIG. 12.

Figure 12:
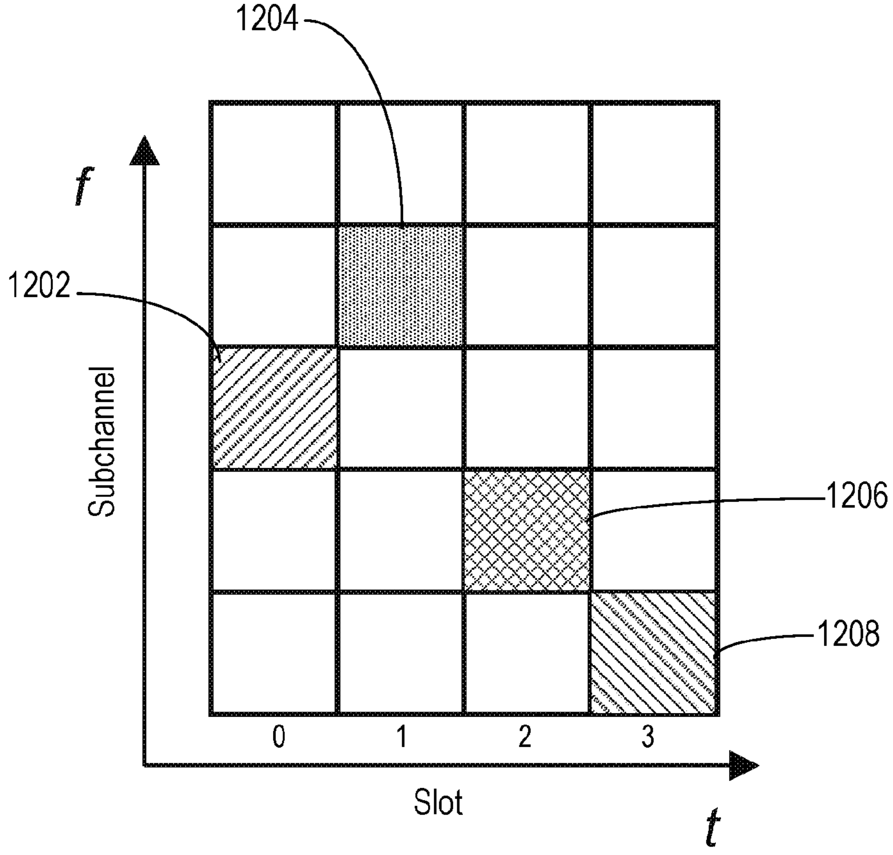
FIG. 12 illustrates transmitting messages including set of resources for different UEs within different time slots.

For example, as illustrated in FIG. 12, the first UE 904 may transmit the first message 1202 to the second UE 906 including the indication of the first set of resources for the one or more transmissions by the second UE 906 within a first slot (e.g., slot #0). Additionally, as illustrated, the first UE 904 may transmit the second message 1204 to the third UE 908 including the indication of the second set of resources for the one or more transmissions by the third UE 908 within a second slot (e.g., slot #1). Further, as shown, if the first UE 904 has received additional requests for inter-UE coordination information for additional UEs, the first UE 904 may transmit indications of other sets of resources for one or more transmissions by these additional UEs in different slots. For example, as shown, the first UE 904 may transmit a third message 1206 including an indication of the third set of resources for one or more transmissions by a fourth UE within a third slot (e.g., slot #2) and may transmit a fourth message 1208 including an indication of a fourth set of resources for one or more transmissions by a fourth UE within a fourth slot (e.g., slot #3).

In some cases, rather than transmitting the first indication indicating the first set of resources and the second indication indicating the second set of resources in separate messages and resources (e.g., time slots), the first UE 904 may multiplex the first indication and the second indication and send them in one message to both the second UE 906 and the third UE 908 in one time and frequency resource (e.g., slot/sub-channel resource).

For example, in some cases, transmitting the first indication to the second UE and the second indication to the third UE at 915 in FIG. 9 may include multiplexing and transmitting the first indication and the second indication in a first message to both the second UE 906 and the third UE 908 in at least a first time and frequency resource. In some cases, the first indication may be identifiable to the second UE 906 in the first message based on an identifier (ID) associated with the second UE 906. Likewise, the second indication may be identifiable to the third UE 908 in the first message based on an ID associated with the third UE 908. In some cases, the first message may comprise a groupcast message.

In some cases, the first UE 904 may transmit the first indication indicating the first set of resources for the one or more transmissions by the second UE 906 in a first message, which includes a resource reservation for a second message to be transmitted that includes the second indication indicating the second set of resources for the one or more transmissions by the third UE 908. More specifically, for example, at 915 in FIG. 9, the first UE 904 transmits the first indication to the second UE 906 in a first message via a first resource. In some cases, the first message may include an indication of a second resource for transmitting a second message that includes the second indication of the second set of resources for one or more transmissions by the third UE 908.

In some cases, whether the second resource is used for transmitted the second message may depend on whether an acknowledgement message has been received in response to the first message. More specifically, in some cases, the first UE 904 may transmit the second message that includes the second indication of the second set of resources for one or more transmissions by the third UE via the second resource based on an acknowledgment received from the second UE that acknowledges reception of the first message. For example, in some cases, the second UE 906 may receive the first message including the first indication indicating the first set of resources. In response to the first message, the second UE 906 may transmit an acknowledgement message to the first UE 904, acknowledging reception of the first message. The first UE 904 may then transmit the second message to the third UE 908 via the second resource in response to receiving the acknowledgement from the second UE 906.

In some cases, whether the first UE 904 transmits the first message before the second message or the second message before the first message may depend on a delay requirement associated with each of the first message and the second message. For example, in some cases, if the delay requirement associated with the first message is low, then the first UE 904 may transmit the first message before the second message.

In some cases, the first UE 904 may determine the first set of resources for the one or more transmissions by the second UE 906 and the second set of resources for the third UE 908 such that resources within the first set of resources and the second set of resources are orthogonal/do not overlap so as to avoid collisions. In other words, in this case, the first set of resources and the second set of resources do not include overlapping resources.

In other cases, the first UE 904 may determine the first set of resources for the one or more transmissions by the second UE 906 and the second set of resources for the third UE 908 such that the first set of resources and the second set of resources include at least some overlapping resources. In this case, the first UE 904 may directly schedule a first resource in the overlapping resources for a first transmission of the one or more transmissions by the second UE 906. The first UE 904 may also directly schedule a second resource in the overlapping resources for a first transmission of the one or more transmissions by the third UE 908. The first UE 904 may then transmit a third indication indicating the first resource in the overlapping resources scheduled for the first transmission of the one or more transmissions by the second UE 906 and transmit a fourth indication indicating a second resource in the overlapping resources scheduled for a first transmission of the one or more transmissions by the third UE 908.

In some cases, the first UE 904 may transmit a groupcast message to the second UE 906 and third UE 908 (including other UEs for which the first UE 904 has received a request for inter-UE coordination information), including the first indication indicating the first set of resources, the second indication indicating the second set of resources, the third indication indicating the first resources in the overlapping resources scheduled for the first transmission of the one or more transmissions by the second UE 906, and the fourth indication indicating the second resource in the overlapping resources scheduled for the first transmission of the one or more transmissions by the third UE 908. The groupcast message may allow each of the second UE 906 and the third UE 908 to know the resources scheduled for the first transmissions by the second UE 906 and third UE 908.

Example Methods for Inter-UE Coordination

Figure 13:
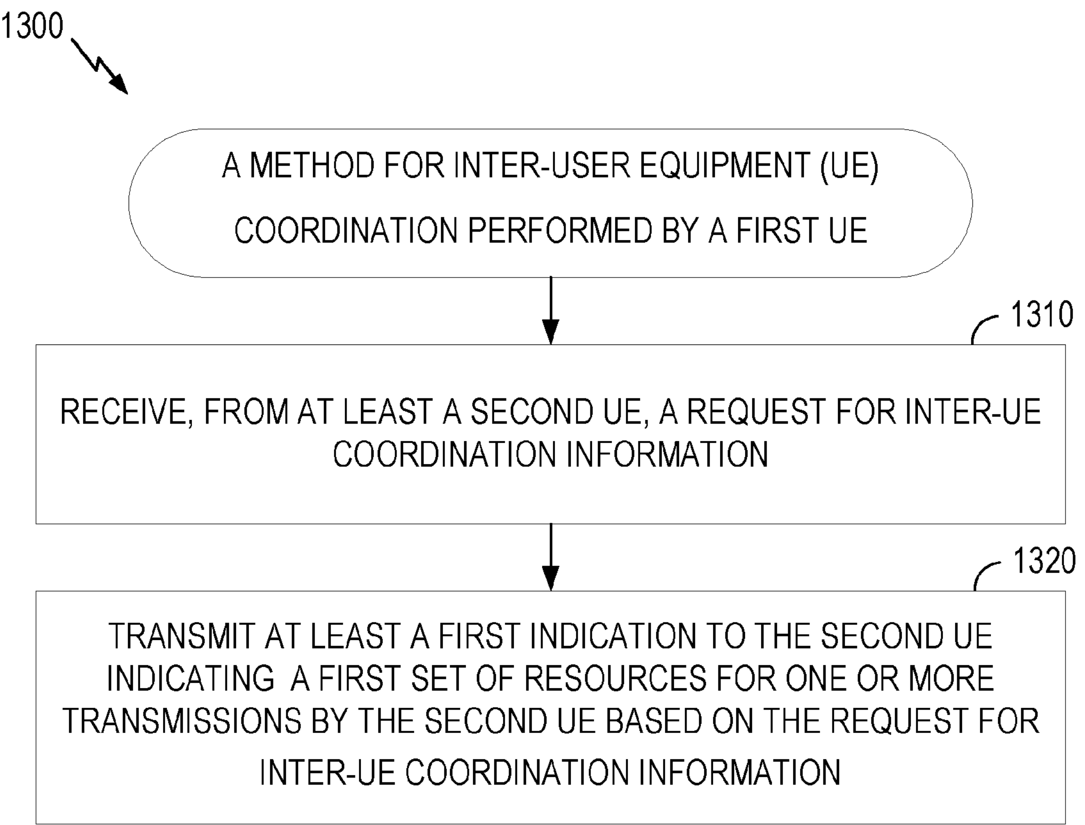
FIG. 13 is a flow diagram illustrating example operations for wireless communication.

FIG. 13 is a flow diagram illustrating example operations 1300 for wireless communication, in accordance with certain aspects of the present disclosure. The operations 1300 may be performed, for example, by a first UE (e.g., such as the UE 104 in the wireless communication network 100 of FIG. 1 and/or the first UE 904 illustrated in FIG. 9) for inter-UE coordination. The operations 1300 may be implemented as software components that are executed and run on one or more processors (e.g., controller/processor 280 of FIG. 2). Further, the transmission and reception of signals by the first UE in operations 1300 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

Operations 1300 begin in block 1310 with receiving, from at least a second UE, a request for inter-UE coordination information.

At 1320, the first UE transmits at least a first indication to the second UE indicating a first set of resources for one or more transmissions by the second UE based on the request for inter-UE coordination information.

In some cases, operations 1300 further include performing one or more channel measurements within a sensing window and determining, based on the one or more channel measurements, the first set of resources for the one or more transmissions by the second UE within a resource selection window.

In some cases, determining the first set of resources comprises excluding resources corresponding to time slots associated with a reference signal received power (RSRP) above a threshold RSRP. In some cases, the threshold RSRP is greater than a pre-configured RSRP exclusion threshold. In some cases, the threshold RSRP is based on an in-channel selectivity performance.

In some cases, the first indication indicating the first set of resources comprises a plurality of different starting slot and sub-channel positions for each different resource included in the first set of resources.

In some cases, the first indication indicating the first set of resources comprises a bitmap, indicating which resources from a plurality of resources are included within the first set of resources.

In some cases, the first indication indicating the first set of resources includes additional information indicating at least one of a preference associated with each resource included within the first set of resources or a reference signal received power (RSRP) associated with each resource included within the first set of resources.

In some cases, operations 1300 further include receiving a second message from the second UE, indicating a set of preferred resources for the one or more transmissions by the second UE and determining the first set of resources based on the set of preferred resources for the one or more transmissions by the second UE.

In some cases, operations 1300 further include receiving another request for inter-UE coordination information from a third UE and transmitting a second indication to the third UE indicating a second set of resources for one or more transmissions by the third UE based on the other request for inter-UE coordination information.

In some cases, transmitting the first indication to the second UE and second indication to the third UE, comprises: transmitting the first indication to the second UE in a first message, and transmitting the second indication to the third UE in a second message.

In some cases, transmitting the first message and the second message comprises transmitting the first message and the second message in different time slots.

In some cases, transmitting the first indication to the second UE and the second indication to the third UE comprises multiplexing and transmitting the first indication and the second indication in a first message to both the second UE and the third UE in at least a first time and frequency resource. In some cases, the first indication is identifiable in the first message based on an identifier (ID) associated with the second UE. Additionally, in some cases, the second indication is identifiable in the first message based on an ID associated with the third UE. In some cases, the first message comprises a groupcast message.

In some cases, transmitting the first indication to the second UE comprises transmitting the first indication to the second UE in a first message via a first resource, wherein the first message includes an indication of a second resource for transmitting a second message that includes the second indication of the second set of resources for one or more transmissions by the third UE.

In some cases, operations 1300 further include transmitting the second message that includes the second indication of the second set of resources for one or more transmissions by the third UE based on an acknowledgment received from the second UE that acknowledges reception of the first message. In some cases, transmitting the first message that includes the first indication to the second UE is based on a delay requirement associated with the first message and the second message.

In some cases, the first set of resources and the second set of resources do not include overlapping resources.

In some cases, the first set of resources and the second set of resources include overlapping resources. In such cases, operations 1300 further include, when first set of resources and the second set of resources include overlapping resources, transmitting a third indication indicating a first resource in the overlapping resources scheduled for a first transmission of the one or more transmissions by the second UE and transmitting a fourth indication indicating a second resource in the overlapping resources scheduled for a first transmission of the one or more transmissions by the third UE. In some cases, the first indication, the second indication, the third indication, and the fourth indication are transmitted in a first message groupcast to both the second UE and third UE.

FIG. 14 is a flow diagram illustrating example operations 1400 for wireless communication, in accordance with certain aspects of the present disclosure. The operations 1400 may be performed, for example, by a second UE (e.g., such as the UE 104 in the wireless communication network 100 of FIG. 1 and/or the second UE 906 illustrated in FIG. 9) for inter-UE coordination. The operations 1400 may be implemented as software components that are executed and run on one or more processors (e.g., controller/processor 280 of FIG. 2). Further, the transmission and reception of signals by the second UE in operations 1400 may be enabled, for example, by one or more antennas (e.g., antennas 252 of FIG. 2). In certain aspects, the transmission and/or reception of signals by the second UE may be implemented via a bus interface of one or more processors (e.g., controller/processor 280) obtaining and/or outputting signals.

Operations 1400 begin in block 1410 with transmitting, to a first UE, a request for inter-UE coordination information.

In block 1420, the second UE receives a first indication from the first UE indicating a first set of resources for one or more transmissions by the second UE based on the request for inter-UE coordination information.

In block 1430, the second UE transmits, based on the first received indication of the first set of resources, the one or more transmissions using a second set of resources.

In some cases, operations 1400 further include performing one or more channel measurements within a sensing window and determining, based at least in part on the one or more channel measurements, a set of available resources for the one or more transmissions within a resource selection window.

In some cases, operations 1400 further include determining an intersecting set of resources from the set of available resources and the first set of resources. In some cases, the second set of resources used to transmit the one or more transmissions comprises one or more resources of the intersecting set of resources when the intersecting set of resources is at least a threshold percentage of the first set of resources.

In some cases, the second set of resources used to transmit the one or more transmissions comprises one or more resources of the set of available resources when the intersecting set of resources is less than the threshold percentage of the first set of resources.

In some cases, the second set of resources used to transmit the one or more transmissions comprises one or more resources of the intersecting set of resources when the set of available resources is at least a threshold percentage of a number of resources within the resource selection window.

In some cases, the set of available resources include resources with channel measurements below a reference signal received power (RSRP) threshold. In such cases, operations 1400 further include determining the intersecting set of resources is below a threshold amount of resources. Additionally, in some cases, operations 1400 further include increasing the RSRP threshold until the intersecting set of resources is greater than or equal to the threshold amount of resources or a maximum RSRP threshold has been reached, whichever is first.

In some cases, operations 1400 further include determining whether the first set of resources are up to date based on a timer associated with the first set of resources. In some cases, when the timer associated with the first set of resources has expired, the second set of resources comprises one or more resources from the set of available resources, and when the timer associated with the first set of resources has not expired, the second set of resources comprises one or more resources from an intersecting set of resources determined from the set of available resources and the first set of resources.

In some cases, operations 1400 further include determining an amount of usable resources from the first set of resources. In some cases, when the amount of usable resources from the first set of resources is less than a threshold amount of usable resources, the second set of resources comprises one or more resources from the set of available resources. Additionally, in some cases, when the amount of usable resources from the first set of resources is greater than or equal to the threshold amount of usable resources, the second set of resources comprises one or more usable resources from the first set of resources.

In some cases, determining the amount of usable resources comprises determining a set of unusable resources from the first set of resources. In some cases, the set of unusable resources comprises resources from the first set of resources that are at least one of: outside a resource selection window associated with the second UE or excluded by the second UE based on the one or more channel measurements.

In some cases, operations 1400 further include transmitting a message to the first UE, indicating a set of preferred resources selected from the set of available resources for the one or more transmissions, wherein the first set of resources is based on the set of preferred resources.

In some cases, the first indication indicating the first set of resources comprises a plurality of different starting slot and sub-channel positions for each different resource included in the first set of resources.

In some cases, the first indication indicating the first set of resources comprises a bitmap, indicating which resources from a plurality of resources are included within the first set of resources.

In some cases, the first indication indicating the first set of resources includes additional information indicating at least one of a preference associated with each resource included within the first set of resources or a reference signal received power (RSRP) associated with each resource included within the first set of resources.

In some cases, the first set of resources comprise resources not preferred by the first UE for the one or more transmissions.

In some cases, operations 1400 further include not excluding resources in the first set of resources from the second set of resources that have reference signal received power (RSRP) measurements below an RSRP threshold. In some cases, the RSRP threshold is based on a first priority associated with the one or more transmissions by the second UE. In some cases, the RSRP threshold is based further on a second priority associated with the resources not preferred by the first UE.

In some cases, the first indication is received in a first message in a time slot that is different from a second time slot used to carry a second message including a second set of resources associated with inter-UE coordination for a third UE.

In some cases, the first indication is received in a first message and is multiplexed in the first message with a second indication of a second set of resources associated with inter-UE coordination for a third UE. In some cases, the first indication is identifiable in the first message based on an identifier (ID) associated with the second UE. In some cases, first message comprises a groupcast message.

In some cases, receiving the first indication from the first UE comprises receiving the first indication from the first UE in a first message via a first resource. In some cases, the first message includes an indication of a second resource for transmitting a second message that includes a second indication of a second set of resources for one or more transmissions by a third UE.

In some cases, operations 1400 further include transmitting an acknowledgment message to the first UE, acknowledging reception of the first message.

In some cases, the first set of resources do not overlap with a second set of resources associated with inter-UE coordination for a third UE.

In some cases, the first set of resources include resources that overlap with a second set of resources associated a third UE. In such cases, operations 1400 further include, when the first set of resources includes resources that overlap with the second set of resources for the third UE, receiving a second indication indicating a first resource in the overlapping resources scheduled for a first transmission of the one or more transmissions by the second UE. In some cases, the first indication and the second indication are received in a first message groupcast to both the second UE and third UE.

Example Wireless Communication Devices

Figure 15:
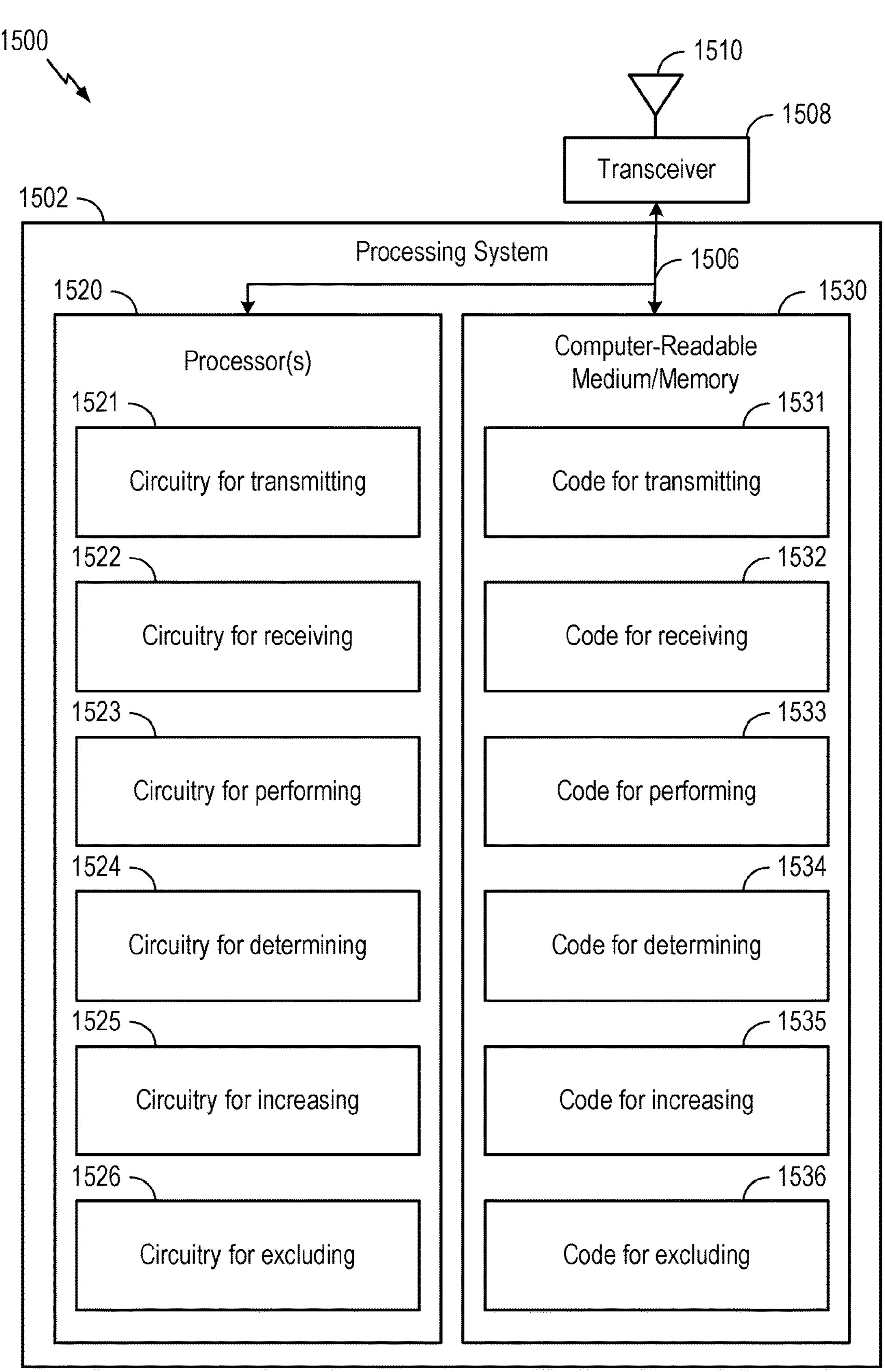
FIG. 15 depicts aspects of an example communications device.

FIG. 15 depicts an example communications device 1500 that includes various components operable, configured, or adapted to perform operations for the techniques disclosed herein, such as the operations depicted and described with respect to FIGS. 9, 13, and 14. In some examples, communications device 1500 may be a UE 104 as described, for example with respect to FIGS. 1 and 2. In some examples, the communications device 1500 may be a first UE (e.g., first UE 904), a second UE (e.g., second UE 906), or a third UE (e.g., third UE 908).

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 9, 13, and 14, or other operations for performing the various techniques discussed herein for inter-UE coordination.

In the depicted example, computer-readable medium/memory 1530 stores code 1531 for transmitting, code 1532 for receiving, code 1533 for performing, code 1534 for determining, code 1535 for increasing, and code 1536 for excluding.

In the depicted example, the one or more processors 1520 include circuitry configured to implement the code stored in the computer-readable medium/memory 1530, including circuitry 1521 for transmitting, circuitry 1522 for receiving, circuitry 1523 for performing, circuitry 1524 for determining, circuitry 1525 for increasing, and circuitry 1526 for excluding.

Various components of communications device 1500 may provide means for performing the methods described herein, including with respect to FIGS. 9, 13, and 14.

In some examples, means for transmitting or sending (or means for outputting for transmission) may include the transceivers 254 and/or antenna(s) 252 of the UE 104 illustrated in FIG. 2 and/or transceiver 1508 and antenna 1510 of the communication device 1500 in FIG. 15.

In some examples, means for receiving (or means for obtaining) may include the transceivers 254 and/or antenna (s) 252 of the UE 104 illustrated in FIG. 2 and/or transceiver 1508 and antenna 1510 of the communication device 1500 in FIG. 15.

In some examples, means for performing, means for determining, means for increasing, and means for excluding may include various processing system components, such as: the one or more processors 1520 in FIG. 15, or aspects of the UE 104 depicted in FIG. 2, including receive processor 258, transmit processor 264, TX MIMO processor 266, and/or controller/processor 280 (including inter-UE coordination component 281).

Notably, FIG. 15 is an example, and many other examples and configurations of communication device 1500 are possible.

Example Clauses

Implementation examples are described in the following numbered clauses:

Clause 1: A method for wireless communication by a second user equipment (UE), comprising: transmitting, to a first UE, a request for inter-UE coordination information; receiving a first indication from the first UE indicating a first set of resources for one or more transmissions by the second UE based on the request for inter-UE coordination information; and transmitting, based on the received first indication of the first set of resources, the one or more transmissions using a second set of resources.

Clause 2: The method of Clause 1, further comprising: performing one or more channel measurements within a sensing window; and determining, based at least in part on the one or more channel measurements, a set of available resources for the one or more transmissions within a resource selection window.

Clause 3: The method of Clause 2, further comprising determining an intersecting set of resources from the set of available resources and the first set of resources.

Clause 4: The method of Clause 3, wherein the second set of resources used to transmit the one or more transmissions comprises one or more resources of the intersecting set of resources when the intersecting set of resources is at least a threshold percentage of the first set of resources.

Clause 5: The method of Clause 4, wherein the second set of resources used to transmit the one or more transmissions comprises one or more resources of the set of available resources when the intersecting set of resources is less than the threshold percentage of the first set of resources.

Clause 6: The method of Clause 3, wherein the second set of resources used to transmit the one or more transmissions comprises one or more resources of the intersecting set of resources when the set of available resources is at least a threshold percentage of a number of resources within the resource selection window.

Clause 7: The method of Clause 3, wherein: the set of available resources include resources with channel measurements below a reference signal received power (RSRP) threshold, and the method further comprises: determining the intersecting set of resources is below a threshold amount of resources; and increasing the RSRP threshold until the intersecting set of resources is greater than or equal to the threshold amount of resources or a maximum RSRP threshold has been reached, whichever is first.

Clause 8: The method of any of Clauses 2-7, further comprising determining whether the first set of resources are up to date based on a timer associated with the first set of resources.

Clause 9: The method of Clause 8, wherein: when the timer associated with the first set of resources has expired, the second set of resources comprises one or more resources from the set of available resources, and when the timer associated with the first set of resources has not expired, the second set of resources comprises one or more resources from an intersecting set of resources determined from the set of available resources and the first set of resources.

Clause 10: The method of and of Clauses 2-9, further comprising determining an amount of usable resources from the first set of resources.

Clause 11: The method of Clause 10, wherein: when the amount of usable resources from the first set of resources is less than a threshold amount of usable resources, the second set of resources comprises one or more resources from the set of available resources, and when the amount of usable resources from the first set of resources is greater than or equal to the threshold amount of usable resources, the second set of resources comprises one or more usable resources from the first set of resources.

Clause 12: The method of and of Clauses 10-11, wherein: determining the amount of usable resources comprises determining a set of unusable resources from the first set of resources, and the set of unusable resources comprises resources from the first set of resources that are at least one of: outside a resource selection window associated with the second UE, or excluded by the second UE based on the one or more channel measurements.

Clause 13: The method of any of Clauses 2-12, further comprising transmitting a message to the first UE, indicating a set of preferred resources selected from the set of available resources for the one or more transmissions, wherein the first set of resources is based on the set of preferred resources.

Clause 14: The method of any of Clauses 1-13, wherein the first indication indicating the first set of resources comprises a plurality of different starting slot and sub-channel positions for each different resource included in the first set of resources.

Clause 15: The method of any of Clauses 1-14, wherein the first indication indicating the first set of resources comprises a bitmap, indicating which resources from a plurality of resources are included within the first set of resources.

Clause 16: The method of any of Clauses 1-15, wherein the first indication indicating the first set of resources includes additional information indicating at least one of a preference associated with each resource included within the first set of resources or a reference signal received power (RSRP) associated with each resource included within the first set of resources.

Clause 17: The method of any of Clauses 1-16, wherein the first set of resources comprise resources not preferred by the first UE for the one or more transmissions.

Clause 18: The method of Clause 17, further comprising not excluding resources in the first set of resources from the second set of resources that have reference signal received power (RSRP) measurements below an RSRP threshold.

Clause 19: The method of Clause 18, wherein the RSRP threshold is based on a first priority associated with the one or more transmissions by the second UE.

Clause 20: The method of Clause 19, wherein the RSRP threshold is based further on a second priority associated with the resources not preferred by the first UE.

Clause 21: The method of any of Clauses 1-20, wherein the first indication is received in a first message in a time slot that is different from a second time slot used to carry a second message including a second set of resources associated with inter-UE coordination for a third UE.

Clause 22: The method of any of Clauses 1-20, wherein: the first indication is received in a first message and is multiplexed in the first message with a second indication of a second set of resources associated with inter-UE coordination for a third UE, and the first indication is identifiable in the first message based on an identifier (ID) associated with the second UE.

Clause 23: The method of Clause 22, wherein the first message comprises a groupcast message.

Clause 24: The method of any of Clauses 1-21, wherein receiving the first indication from the first UE comprises receiving the first indication from the first UE in a first message via a first resource, wherein the first message includes an indication of a second resource for transmitting a second message that includes a second indication of a second set of resources for one or more transmissions by a third UE.

Clause 25: The method of Clause 24, further comprising transmitting an acknowledgment message to the first UE, acknowledging reception of the first message.

Clause 26: The method of any of Clauses 1-25, wherein the first set of resources do not overlap with a second set of resources associated with inter-UE coordination for a third UE.

Clause 27: The method of any of Clauses 1-25, wherein: the first set of resources include resources that overlap with a second set of resources associated a third UE, and the method further comprises, when the first set of resources includes resources that overlap with the second set of resources for the third UE, receiving: a second indication indicating a first resource in the overlapping resources scheduled for a first transmission of the one or more transmissions by the second UE.

Clause 28: The method of Clause 27, wherein the first indication and the second indication are received in a first message groupcast to both the second UE and third UE.

Clause 29: A method for wireless communication by a first user equipment (UE), comprising: receiving, from at least a second UE, a request for inter-UE coordination information; and transmitting at least a first indication to the second UE indicating a first set of resources for one or more transmissions by the second UE based on the request for inter-UE coordination information.

Clause 30: The method of Clause 29, further comprising: performing one or more channel measurements within a sensing window; and determining, based on the one or more channel measurements, the first set of resources for the one or more transmissions by the second UE within a resource selection window.

Clause 31: The method of Clause 30, wherein determining the first set of resources comprises excluding resources corresponding to time slots associated with a reference signal received power (RSRP) above a threshold RSRP.

Clause 32: The method of Clause 31, wherein the threshold RSRP is greater than a pre-configured RSRP exclusion threshold.

Clause 33: The method of Clause 32, wherein the threshold RSRP is based on an in-channel selectivity performance.

Clause 34: The method of any of Clauses 29-33, wherein the first indication indicating the first set of resources comprises a plurality of different starting slot and sub-channel positions for each different resource included in the first set of resources.

Clause 35: The method of any of Clauses 29-33, wherein the first indication indicating the first set of resources comprises a bitmap, indicating which resources from a plurality of resources are included within the first set of resources.

Clause 36: The method of any of Clauses 29-35, wherein the first indication indicating the first set of resources includes additional information indicating at least one of a preference associated with each resource included within the first set of resources or a reference signal received power (RSRP) associated with each resource included within the first set of resources.

Clause 37: The method of any of Clauses 29-36, further comprising: receiving a second message from the second UE, indicating a set of preferred resources for the one or more transmissions by the second UE; and determining the first set of resources based on the set of preferred resources for the one or more transmissions by the second UE.

Clause 38: The method of any of Clauses 29-37, further comprising: receiving another request for inter-UE coordination information from a third UE; and transmitting a second indication to the third UE indicating a second set of resources for one or more transmissions by the third UE based on the other request for inter-UE coordination information.

Clause 39: The method of Clause 38, wherein transmitting the first indication to the second UE and second indication to the third UE, comprises: transmitting the first indication to the second UE in a first message, and transmitting the second indication to the third UE in a second message.

Clause 40: The method of Clause 39, wherein transmitting the first message and the second message comprises transmitting the first message and the second message in different time slots.

Clause 41: The method of Clause 38, wherein: transmitting the first indication to the second UE and the second indication to the third UE comprises multiplexing and transmitting the first indication and the second indication in a first message to both the second UE and the third UE in at least a first time and frequency resource, the first indication is identifiable in the first message based on an identifier (ID) associated with the second UE, and the second indication is identifiable in the first message based on an ID associated with the third UE.

Clause 42: The method of Clause 41, wherein the first message comprises a groupcast message.

Clause 43: The method of any of Clauses 38-39, wherein transmitting the first indication to the second UE comprises transmitting the first indication to the second UE in a first message via a first resource, wherein the first message includes an indication of a second resource for transmitting a second message that includes the second indication of the second set of resources for one or more transmissions by the third UE.

Clause 44: The method of Clause 43, further comprising transmitting the second message that includes the second indication of the second set of resources for one or more transmissions by the third UE based on an acknowledgment received from the second UE that acknowledges reception of the first message.

Clause 45: The method of any of Clauses 43-44, wherein transmitting the first message that includes the first indication to the second UE is based on a delay requirement associated with the first message and the second message.

Clause 46: The method of any of Clauses 38-45, wherein the first set of resources and the second set of resources do not include overlapping resources.

Clause 47: The method of any of Clauses 38-46, wherein: the first set of resources and the second set of resources include overlapping resources, and the method further comprises, when first set of resources and the second set of resources include overlapping resources, transmitting: a third indication indicating a first resource in the overlapping resources scheduled for a first transmission of the one or more transmissions by the second UE, and a fourth indication indicating a second resource in the overlapping resources scheduled for a first transmission of the one or more transmissions by the third UE.

Clause 48: The method of Clause 47, wherein the first indication, the second indication, the third indication, and the fourth indication are transmitted in a first message groupcast to both the second UE and third UE.

Clause 49: An apparatus, comprising: a memory comprising executable instructions; one or more processors configured to execute the executable instructions and cause the apparatus to perform a method in accordance with any one of Clauses 1-48.

Clause 50: An apparatus, comprising means for performing a method in accordance with any one of Clauses 1-48.

Clause 51: A non-transitory computer-readable medium comprising executable instructions that, when executed by one or more processors of an apparatus, cause the apparatus to perform a method in accordance with any one of Clauses 1-48.

Clause 52: A computer program product embodied on a computer-readable storage medium comprising code for performing a method in accordance with any one of Clauses 1-48.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term “cell” can refer to a coverage area of a NodeB and/or a narrowband subsystem serving this coverage area, depending on the context in which the term is used. In NR systems, the term “cell” and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mm Wave or near mm Wave frequencies, the BS 180 may be referred to as an mm Wave base station.

The communication links 120 between the BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of inter-UE coordination in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a second user equipment (UE), comprising:

transmitting, to a first UE, a request for inter-UE coordination information;

performing one or more channel measurements within a sensing window;

determining, based at least in part on the one or more channel measurements, a set of available resources for one or more transmissions by the second UE within a resource selection window;

transmitting a message to the first UE, indicating a set of preferred resources selected from the set of available resources for the one or more transmissions by the second UE;

receiving a first indication from the first UE indicating a first set of resources for the one or more transmissions by the second UE based on the request for inter-UE coordination information and the set of preferred resources; and transmitting, based on the received first indication of the first set of resources, the one or more transmissions using a second set of resources.

2. The method of claim 1, further comprising determining an intersecting set of resources from the set of available resources and the first set of resources.

3. The method of claim 2, wherein the second set of resources used to transmit the one or more transmissions comprises one or more resources of the intersecting set of resources when the intersecting set of resources is at least a threshold percentage of the first set of resources.

4. The method of claim 3, wherein the second set of resources used to transmit the one or more transmissions comprises one or more resources of the set of available resources when the intersecting set of resources is less than the threshold percentage of the first set of resources.

5. The method of claim 2, wherein the second set of resources used to transmit the one or more transmissions comprises one or more resources of the intersecting set of resources when the set of available resources is at least a threshold percentage of a number of resources within the resource selection window.

6. The method of claim 2, wherein:

the set of available resources include resources with channel measurements below a reference signal received power (RSRP) threshold, and the method further comprises:

determining the intersecting set of resources is below a threshold amount of resources; and increasing the RSRP threshold until the intersecting set of resources is greater than or equal to the threshold amount of resources or a maximum RSRP threshold has been reached, whichever is first.

7. The method of claim 1, further comprising determining whether the first set of resources are up to date based on a timer associated with the first set of resources.

8. The method of claim 7, wherein:

when the timer associated with the first set of resources has expired, the second set of resources comprises one or more resources from the set of available resources, and when the timer associated with the first set of resources has not expired, the second set of resources comprises one or more resources from an intersecting set of resources determined from the set of available resources and the first set of resources.

9. The method of claim 1, further comprising determining an amount of usable resources from the first set of resources.

10. The method of claim 9, wherein:

when the amount of usable resources from the first set of resources is less than a threshold amount of usable resources, the second set of resources comprises one or more resources from the set of available resources, and when the amount of usable resources from the first set of resources is greater than or equal to the threshold amount of usable resources, the second set of resources comprises one or more usable resources from the first set of resources.

11. The method of claim 9, wherein:

determining the amount of usable resources comprises determining a set of unusable resources from the first set of resources, and the set of unusable resources comprises resources from the first set of resources that are at least one of:

outside a resource selection window associated with the second UE, or excluded by the second UE based on the one or more channel measurements.

12. The method of claim 1, wherein the first indication indicating the first set of resources comprises a plurality of different starting slot and sub-channel positions for each different resource included in the first set of resources.

13. The method of claim 1, wherein the first indication indicating the first set of resources comprises a bitmap, indicating which resources from a plurality of resources are included within the first set of resources.

14. The method of claim 1, wherein the first indication indicating the first set of resources includes additional information indicating at least one of a preference associated with each resource included within the first set of resources or a reference signal received power (RSRP) associated with each resource included within the first set of resources.

15. The method of claim 1, wherein the first set of resources comprise resources not preferred by the first UE for the one or more transmissions.

16. The method of claim 15, further comprising not excluding resources in the first set of resources from the second set of resources that have reference signal received power (RSRP) measurements below an RSRP threshold.

17. The method of claim 16, wherein the RSRP threshold is based on a first priority associated with the one or more transmissions by the second UE.

18. The method of claim 17, wherein the RSRP threshold is based further on a second priority associated with the resources not preferred by the first UE.

19. A method for wireless communication by a first user equipment (UE), comprising:

receiving, from at least a second UE, a request for inter-UE coordination information;

receiving a message from the second UE, indicating a set of preferred resources for one or more transmissions by the second UE; and transmitting at least a first indication to the second UE indicating a first set of resources for one or more transmissions by the second UE based on the request for inter-UE coordination information and the set of preferred resources.

20. The method of claim 19, further comprising:

performing one or more channel measurements within a sensing window; and determining, based on the one or more channel measurements, the first set of resources for the one or more transmissions by the second UE within a resource selection window.

21. The method of claim 20, wherein determining the first set of resources comprises excluding resources corresponding to time slots associated with a reference signal received power (RSRP) above a threshold RSRP.

22. The method of claim 21, wherein, at least one of:

the threshold RSRP is greater than a pre-configured RSRP exclusion threshold, or the threshold RSRP is based on an in-channel selectivity performance.

23. The method of claim 19, wherein the first indication indicating the first set of resources comprises a plurality of different starting slot and sub-channel positions for each different resource included in the first set of resources.

24. The method of claim 19, wherein the first indication indicating the first set of resources comprises a bitmap, indicating which resources from a plurality of resources are included within the first set of resources.

25. The method of claim 19, wherein the first indication indicating the first set of resources includes additional information indicating at least one of a preference associated with each resource included within the first set of resources or a reference signal received power (RSRP) associated with each resource included within the first set of resources.

26. A second user equipment (UE), comprising:

one or more memories comprising executable instructions; and one or more processors configured to execute the executable instructions to cause the second UE to:

transmit, to a first UE, a request for inter-UE coordination information;

perform one or more channel measurements within a sensing window;

determine, based at least in part on the one or more channel measurements, a set of available resources for one or more transmissions by the second UE within a resource selection window;

transmitting a message to the first UE, indicating a set of preferred resources selected from the set of available resources for the one or more transmissions by the second UE;

receive a first indication from the first UE indicating a first set of resources for one or more transmissions by the second UE based on the request for inter-UE coordination information and the set of preferred resources; and transmit, based on the received first indication of the first set of resources, the one or more transmissions using a second set of resources.

27. A first user equipment (UE), comprising:

one or more memories comprising executable instructions; and one or more processors configured to execute the executable instructions to cause the first UE to:

receive, from at least a second UE, a request for inter-UE coordination information;

receive a message from the second UE, indicating a set of preferred resources for one or more transmissions by the second UE; and transmit at least a first indication to the second UE indicating a first set of resources for one or more transmissions by the second UE based on the request for inter-UE coordination information and the set of preferred resources.

* * * * *